United States Patent
Kim

(10) Patent No.: US 10,373,330 B2
(45) Date of Patent: Aug. 6, 2019

(54) METHOD FOR PREDICTING LOCATION OF MARK

(71) Applicant: Samsung Electronics Co., Ltd., Suwon-si, Gyeonggi-do (KR)

(72) Inventor: Tea-Geon Kim, Asan-si (KR)

(73) Assignee: Samsung Electronics Co., Ltd., Suwon-Si, Gyeonggi-do (KR)

( * ) Notice: Subject to any disclaimer, the term of this patent is extended or adjusted under 35 U.S.C. 154(b) by 261 days.

(21) Appl. No.: 15/405,905

(22) Filed: Jan. 13, 2017

(65) Prior Publication Data
US 2017/0236297 A1    Aug. 17, 2017

(30) Foreign Application Priority Data

Feb. 12, 2016  (KR) .......................... 10-2016-0016475

(51) Int. Cl.
*G06K 9/46*    (2006.01)
*G06T 7/00*    (2017.01)
(Continued)

(52) U.S. Cl.
CPC .............. *G06T 7/70* (2017.01); *G06K 9/3216* (2013.01); *G06K 9/4604* (2013.01);
(Continued)

(58) Field of Classification Search
CPC ....... G06K 9/4604; G06T 7/0004; G06T 7/70; G06T 2207/10016; G06T 2207/30148; G06T 7/0006
See application file for complete search history.

(56) References Cited

U.S. PATENT DOCUMENTS 6,700,603 B1    3/2004  Okuchi et al.
7,575,954 B2*   8/2009  Kong ................ H01L 21/67132
                                              257/E23.009
(Continued)

FOREIGN PATENT DOCUMENTS

EP    1 027 615 B1    9/2008
EP    2 364 072 B1    1/2015
(Continued)

OTHER PUBLICATIONS

Kim et al. ("A Precise Inspection Technique for Wafer Pre-sawing Lines using Affine Transformation," 15th International Conference on Mechatronics and Machine Vision in Practice, Dec. 2-4, 2008) (Year: 2008).*

(Continued)

*Primary Examiner* — Yubin Hung
(74) *Attorney, Agent, or Firm* — Lee & Morse, P.C.

(57) ABSTRACT

A method for predicting the location of mark is performed for a substrate which includes a plurality of electronic device regions each electronic region includes a mark and a reference indication on a first surface and a sawing indication on a second surface opposite to the first surface. The method includes obtaining first and second image information for the first and second surfaces, extracting a sawing line based on the sawing indication in the second image information, calculating a first spaced distance between the sawing line and the reference indication in the first information, calculating a second spaced distance between the sawing line and the reference indication, and predicting the location of the mark based on whether the first and second spaced distances correspond to a predetermined reference distance. The mark is on each of the electronic device regions separated from each other along the sawing line.

20 Claims, 26 Drawing Sheets

(51) Int. Cl.
    *G06T 7/70* (2017.01)
    *G06K 9/32* (2006.01)
    *G06T 7/73* (2017.01)

(52) U.S. Cl.
    CPC .......... *G06T 7/0004* (2013.01); *G06T 7/0006* (2013.01); *G06T 7/73* (2017.01); *G06K 2009/3225* (2013.01); *G06K 2209/19* (2013.01); *G06T 2207/10016* (2013.01); *G06T 2207/30148* (2013.01)

(56) References Cited

U.S. PATENT DOCUMENTS

| | | | | |
|---|---|---|---|---|
| 9,165,890 | B2* | 10/2015 | Ho | H01L 23/544 |
| 2003/0060024 | A1* | 3/2003 | Imori | H01L 21/6836 |
| | | | | 438/460 |
| 2006/0172569 | A1 | 8/2006 | Shiang | |
| 2007/0031993 | A1 | 2/2007 | Nemets et al. | |
| 2008/0316504 | A1 | 12/2008 | Nemets et al. | |
| 2011/0218754 | A1 | 9/2011 | Mori | |
| 2012/0222895 | A1* | 9/2012 | Imamura | H01L 21/481 |
| | | | | 174/260 |
| 2013/0020713 | A1* | 1/2013 | Premachandran | H01L 21/6836 |
| | | | | 257/773 |
| 2015/0013791 | A1 | 1/2015 | Banowetz et al. | |
| 2017/0092804 | A1* | 3/2017 | Peng | H01L 33/486 |

FOREIGN PATENT DOCUMENTS

| | | | |
|---|---|---|---|
| JP | 2002246336 | A * | 8/2002 |
| JP | 2006-210874 | A | 8/2006 |
| KR | 1999-0059041 | A | 7/1999 |
| KR | 2002-0057517 | A | 7/2002 |
| KR | 10-2005-0024275 | A | 3/2005 |
| KR | 10-0818107 | B1 | 3/2008 |
| KR | 10-2009-0030430 | A | 3/2009 |
| KR | 10-2012-0071842 | A | 7/2012 |
| KR | 10-2012-0077745 | A | 7/2012 |
| KR | 10-2012-0108222 | A | 10/2012 |
| KR | 10-2013-0052794 | A | 5/2013 |

OTHER PUBLICATIONS

Wang et al. ("Three-step approach for wafer sawing lane inspection," Optical Engineering, 48(11), Nov. 1, 2009) (Year: 2009).*

* cited by examiner

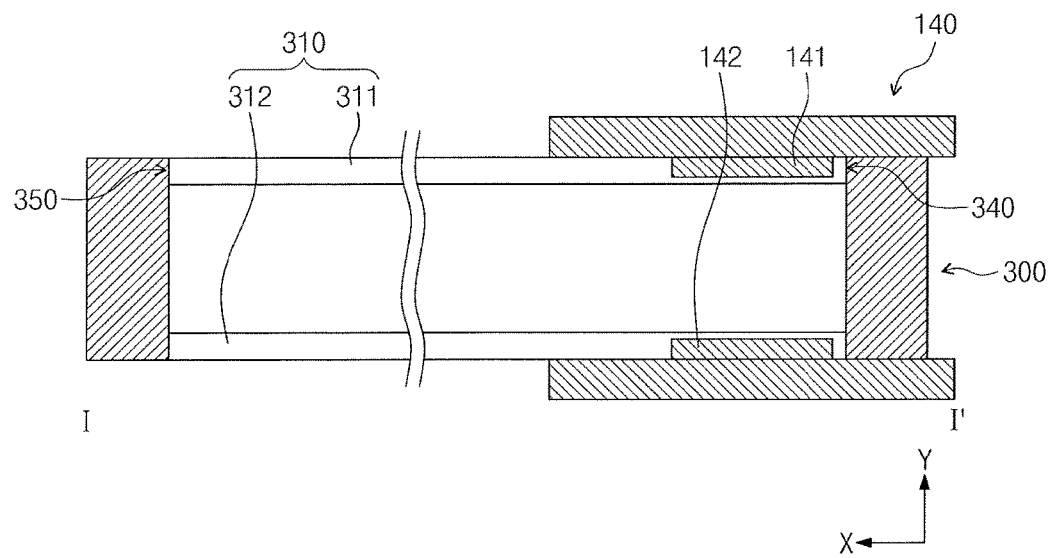
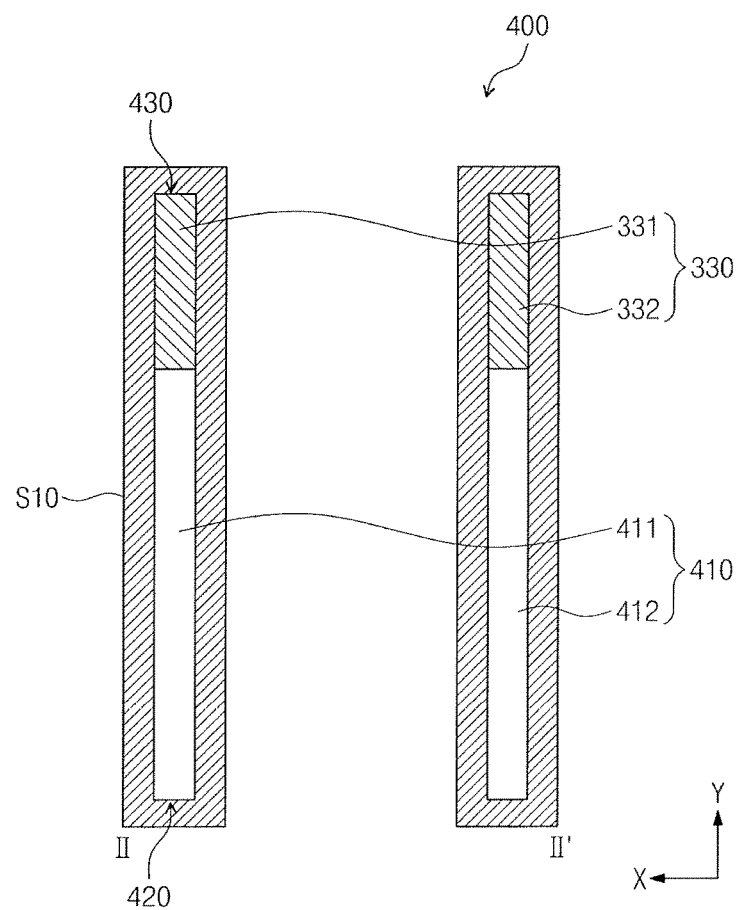

METHOD FOR PREDICTING LOCATION OF MARK

CROSS-REFERENCE TO RELATED APPLICATION

Korean Patent Application No. 10-2016-0016475, filed on Feb. 12, 2016, and entitled, "Method for Predicting Location of Mark," is incorporated by reference herein in its entirety.

BACKGROUND

1. Field

One or more embodiments described herein relate to a method for predicting the location of a mark.

2. Description of the Related Art

A variety of processes are used to manufacture a semiconductor package. These processes include engraving a mark and/or a sawing indication on electronic device regions in a substrate, cutting the electronic device regions using the sawing indication, and inspecting the electronic device regions that are separated from each other. The separated electronic device regions may be released from factories with the mark still engraved thereon.

SUMMARY

In accordance with one or more embodiments, a method for predicting a mark location loading an substrate on a stage, the substrate including a plurality of electronic device regions, each having a mark and a reference indication on a first surface and a sawing indication on a second surface opposite to the first surface; obtaining first and second image information based on images of the first and second surfaces; extracting a sawing line based on the sawing indication in the second image information; calculating a first spaced distance between the sawing line and the reference indication in the first information in a first direction; calculating a second spaced distance between the sawing line and the reference indication in a second direction different from the first direction; and predicting a location of the mark according to whether the first and second spaced distances correspond to a predetermined reference distance, the mark included on each of the electronic device regions which are separated from each other along the sawing line.

In accordance with one or more other embodiments, a method for predicting location of mark includes loading an substrate on a stage, the substrate including a plurality of electronic device regions, each having a mark and a reference indication on a first surface and a sawing indication on a second surface opposite to the first surface; obtaining first and second image information based on images of the first and second surfaces; calculating X-Y coordinates of the reference indication and X-Y coordinates of the sawing indication using the first and second image information; calculating X and Y distances, each between the reference indication and the sawing indication using the X-Y coordinates; and predicting a location of the mark according to whether the X and Y distances correspond to a predetermined reference distance, the mark included on each of the electronic device regions which are separated from each other.

In accordance with one or more other embodiments, a method for inspecting a semiconductor product includes receiving image information for electronic device regions on a substrate; identifying a sawing line based on the image information; determining a position of a reference indication based on the sawing line; and predicting a location of a mark for at least one of the electronic device regions based on the position of the reference indication and predetermined reference information.

In accordance with one or more other embodiments, an apparatus for predicting location of mark may comprise: a stage unit configured to load a substrate including a plurality of electronic device regions each including a mark on one surface thereof, a reference indication on the one surface, and a sawing indication on opposite surface opposite to the one surface; an imaging unit configured to photograph the one surface of the electronic device region so as to obtain first image information and photograph the opposite surface of the electronic device region so as to obtain second image information; and a controller configured to extract a sawing line using the sawing indication included in the second image information and calculating a spaced distance between the sawing line and the reference indication included in the second image information.

BRIEF DESCRIPTION OF THE DRAWINGS

Features will become apparent to those of skill in the art by describing in detail exemplary embodiments with reference to the attached drawings in which:

FIG. 1B illustrates a view taken along section line I-I' in FIG. 1A, and FIG. 1C illustrates a view taken along section line II-II' in FIG. 1A;

DETAILED DESCRIPTION

Figure 1A:
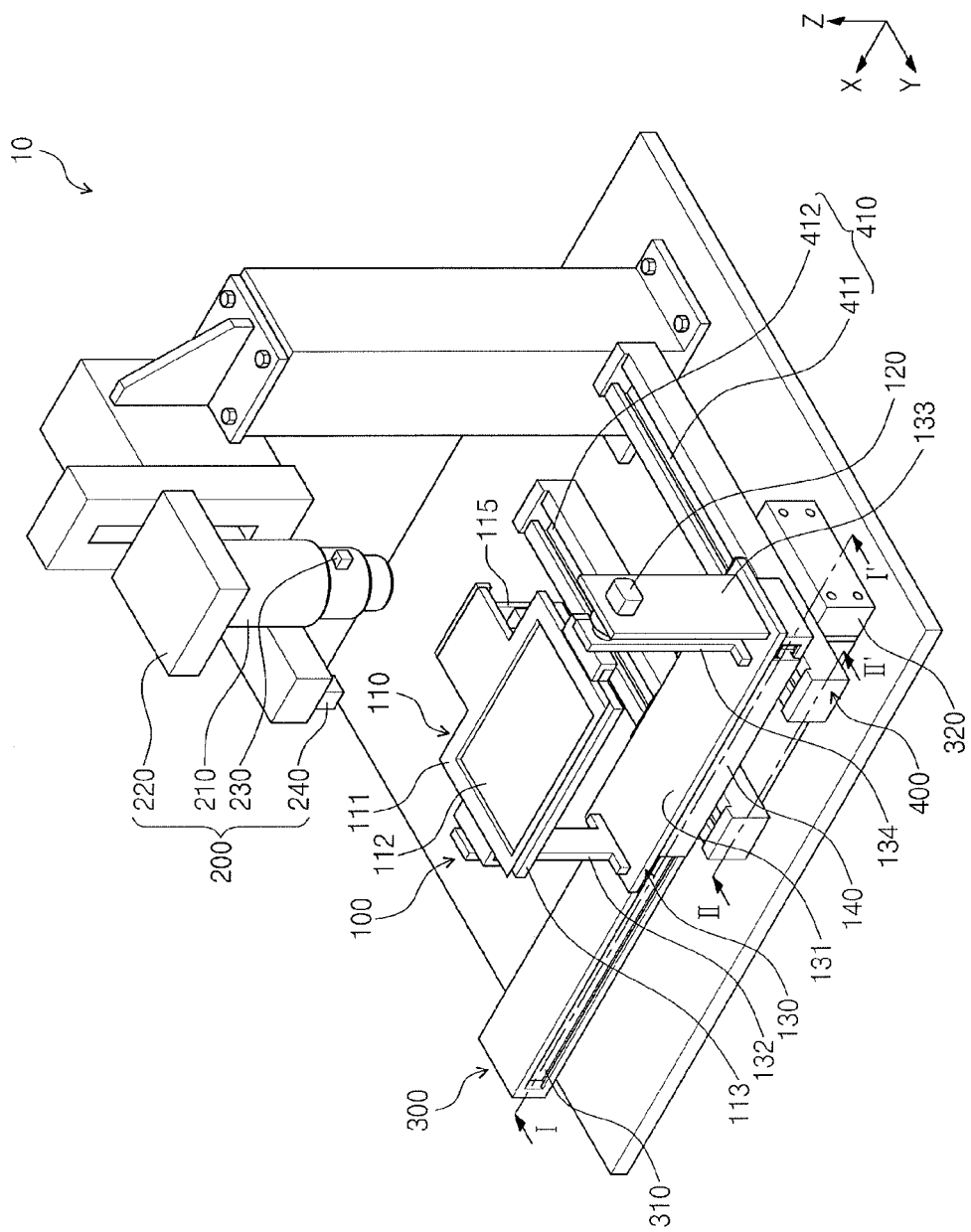
FIG. 1A illustrates an embodiment of an apparatus for predicting the location of mark.
Figure 2:
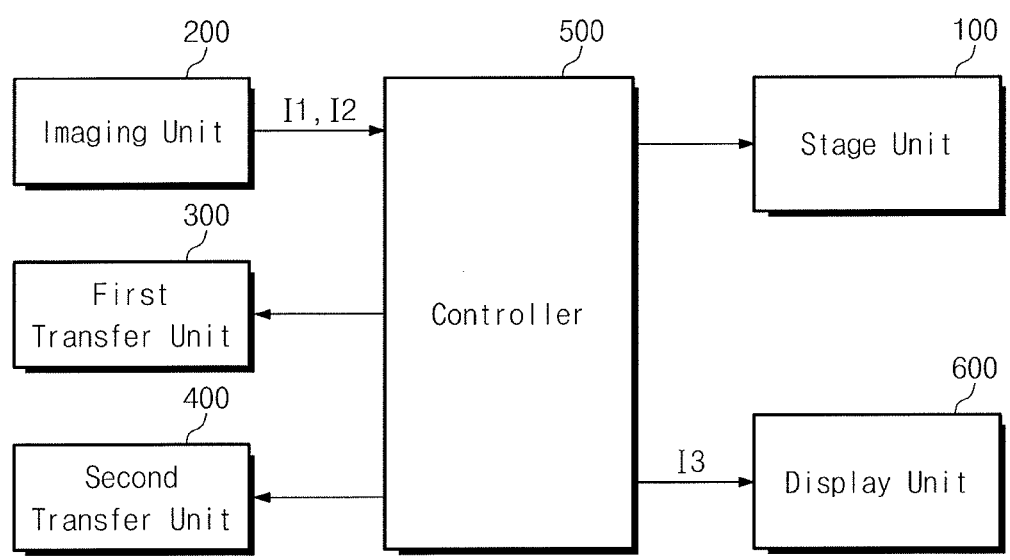
FIG. 2 illustrates an embodiment of an apparatus for predicting a mark location.
Figure 3:
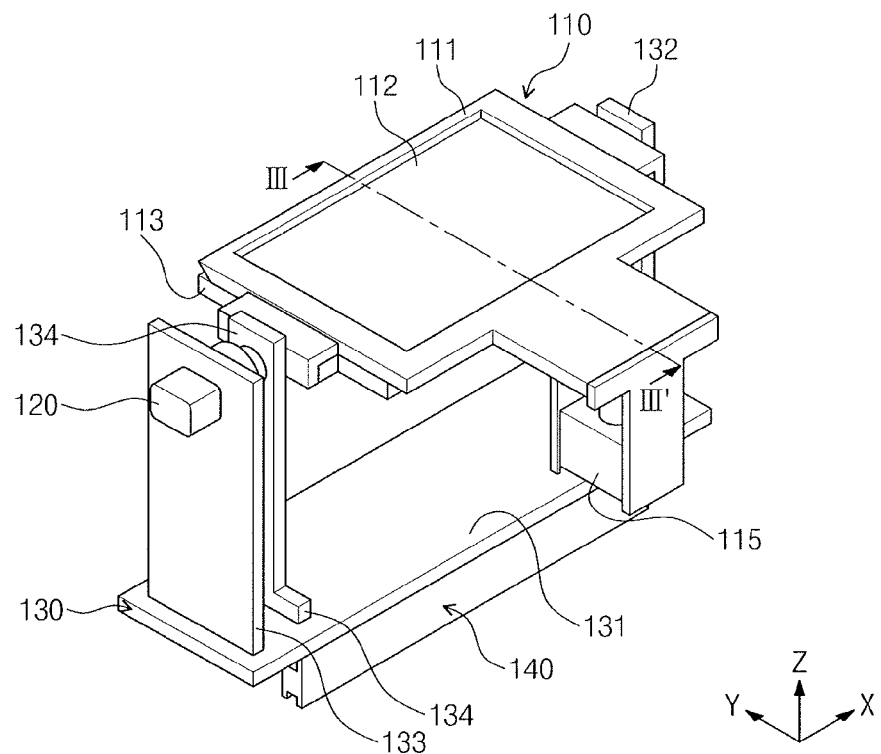
FIG. 3 illustrates an embodiment of a stage.
Figure 4:
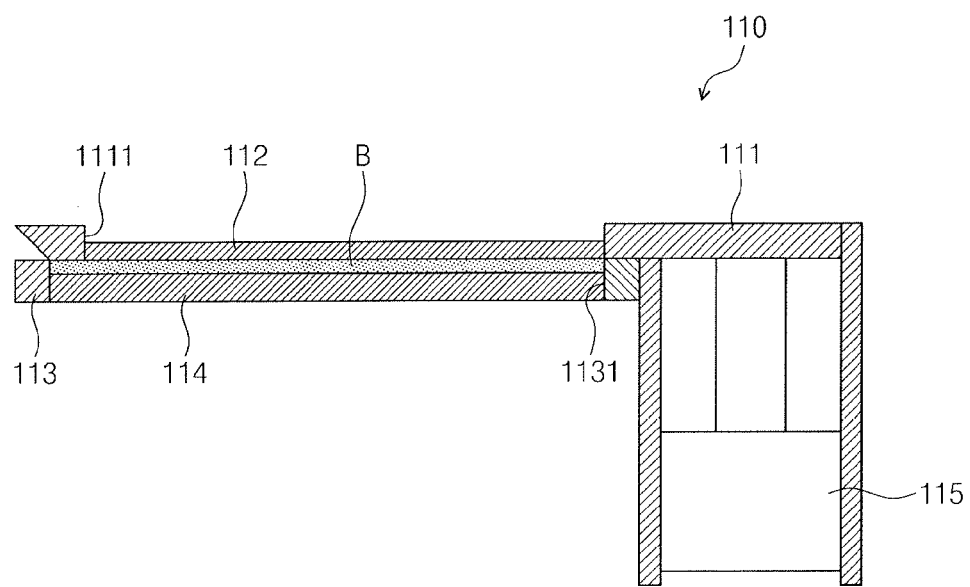
FIG. 4 illustrates a view taken along section line III-III' in FIG. 3.

FIG. 1A illustrates an embodiment of an apparatus 10 for predicting the location of mark, FIG. 1B illustrates a view taken along section line I-I' in FIG. 1A, and FIG. 1C illustrates a view taken along section line II-II' in FIG. 1A. FIG. 2 illustrates an embodiment of an apparatus for predicting the location of mark in FIG. 1A. FIG. 3 illustrates an embodiment of a stage unit. FIG. 4 illustrates a view taken along section line III-III' in FIG. 3.

Referring to FIGS. 1A to 4, the apparatus 10 includes a stage unit 100, an imaging unit 200, a first transfer unit 300, a second transfer unit 400, a controller 500, and a display unit 600. The stage unit 100 includes a stage section 110 to load a semiconductor product (e.g., substrate B), a rotational driving section 120 to rotate the substrate B loaded on the stage section 110, a stage supporting section 130 to support the stage section 110, and a first connecting rail section 140 connected to the first transfer unit 300.

Referring to FIG. 4, the stage section 110 may include a first bracket 111, a first transparent plate 112, a second bracket 113, a second transparent plate 114, and a driving part 115. The first bracket 111 may fixedly put the first transparent plate 112 in place. In an embodiment, the first bracket 111 may include a first opening 1111 in a middle portion of the first bracket. The first bracket 111 may include a first inner wall that surrounds the first opening 1111 and a first insert groove that extends along the first inner wall. The first opening 1111 may have a shape that corresponds to the shape of the first transparent plate 112. In one embodiment, the first opening 1111 may have a rectangular shape. The first insert groove may receive an edge of the first transparent plate 112. Accordingly, the first transparent plate 112 may be fixed in place at the first bracket 111.

The first transparent plate 112 includes a transparent material, e.g., a transparent glass or a transparent plastic. The first transparent plate 112 may have a shape corresponding to substrate B. (Herein, one shape corresponding to another shape may mean the same shape or a similar shape). The first transparent plate 112 may have, for example, a rectangular shape, a regular square shape, a circular shape, or another shape. The substrate B may be on the first transparent plate 112. Accordingly, the first transparent plate 112 may contact one surface of the substrate B.

The second bracket 113 may be fixed in place on the second transparent plate 114. In an embodiment, the second bracket 113 may include a second opening 1131 in the middle portion of the second bracket 113. The second bracket 113 may include a second inner wall surrounding the second opening 1131 and a second insert groove extending along the second inner wall. The second opening 1131 may have a shape corresponding to the second transparent plate 114. In an embodiment, the second opening 1131 may have a rectangular shape. The second insert groove may receive an edge of the second transparent plate 114. Accordingly, the second transparent plate 114 may be fixed in position at the second bracket 113. The second bracket 113 may be on one side of the first bracket 111. In an embodiment, the second bracket 113 may be below the first bracket 111. Thus, the second transparent plate 114 may be under the first transparent plate 112.

The second transparent plate 114 may include a transparent material, e.g., transparent glass or transparent plastic. The second transparent plate 114 may have a shape corresponding to substrate B, e.g., a rectangular shape.

As previously discussed, the second transparent plate 114 may be placed under the first transparent plate 112. The second transparent plate 114 may contact a bottom surface of substrate B. For example, the substrate B may be between the first transparent plate 112 and the second transparent plate 114. Therefore, the substrate B may be immovably loaded on the stage unit 100.

The driving part 115 may move at least one of the first bracket 111 or the second bracket 113 to be adjacent to the first and second transparent plates 112 and 114. In an embodiment, the second bracket 113 may be in a stationary state and the first bracket 111 may be in a movable state. For example, the driving part 115 may move the first bracket 111 along a vertical direction, e.g., a Z-axis direction. In an embodiment, the driving part 115 may include a hydraulic cylinder. In another embodiment, the driving part 115 may have a different structure to move at least one of the first or second brackets 111 and 113.

The rotational driving section 120 may rotate the stage section 110 around an imaginary rotational axis parallel to an X-axis direction. Thus, the substrate B may also rotate in response to the rotational movement of the stage section 110. In an embodiment, the rotational driving section 120 may rotate the stage section 110 a predetermined amount (e.g., about 180°) around the imaginary rotational axis. Thus, the substrate B may also rotate, for example, upside down at about 180°, e.g., the positions of opposing surfaces of an electronic device region A may be changed.

In one embodiment, the rotational driving section 120 may rotate the stage section 110 at a predetermined amount, e.g., about 90°. In an embodiment, the rotational driving section 120 may include a motor, but the present inventive concept is not limited thereto. For example, the rotational driving section 120 may be configured in various ways to rotate the stage section 110. The rotational driving section 120 may be connected to at least one of an end of the first bracket 111 and an end of the second bracket 113. Therefore, the rotational driving section 120 may rotate at least one of the first or second brackets 111 and 113 in order to rotate the substrate B between the first and second transparent plates 112 and 114.

The stage supporting section 130 may support the stage section 110. The stage supporting section 130 may include a base plate 131 and a plurality of supports 132, 133, and 134. The base plate 131 may be spaced apart from the stage section 110. In an embodiment, the base plate 131 may be under and spaced apart from the stage section 110. The supports 132 to 134 may be arranged along a longitudinal direction of the base plate 131. In an embodiment, the supports 132 to 134 may be arranged in the X-axis direction. For example, the supports 132 to 134 may include a first support 132 at one end of the base plate 131, a second support 133 at an opposite end of the base plate 131, and a third support 134 between the first and second supports 132 and 133.

The first support 132 may extend toward the stage section 110 from the one end of the base plate 131. The first support 132 may be hingedly coupled to at least one of ends of the first or second brackets 111 and 113. In an embodiment, the first support 132 may be hingedly coupled to one end of the second bracket 113.

The second support 133 may extend toward the stage section 110 from the opposite end of the base plate 131. The rotational driving section 120 may be installed at an upper portion of the second support 133. For example, the second support 133 may include an insert hall on the upper portion thereof. The insert hall may receive the rotational driving section 120. Thus, the rotational driving section 120 may be coupled to the second support 133.

The third support 134 may extend toward the stage section 110 from the base plate 131. The third support 134 may be hingedly coupled to at least one of opposite ends of the first or second brackets 111 and 113. In an embodiment, the third support 134 may be hingedly coupled to the opposite end of the second bracket 113. Accordingly, the rotational driving section 120 may rotate the stage section 110, which is supported by the first and third supports 132 and 134. The first to third supports 132 to 134 may have the same length extending from the base plate 131 in the Z-axis direction.

The first connecting rail section 140 may be under the stage supporting section 130. In an embodiment, the first connecting rail section 140 may be coupled to a lower portion of the base plate 131. The first connecting rail section 140 may be coupled to a first guide rail 310 of the first transfer unit 300. As shown in FIG. 1B, the first connecting rail section 140 may include two first rails 141 and 142 that linearly extend in the X-axis direction. The first rails 141 and 142 may be arranged parallel to and spaced apart from each other in a Y-axis direction. Each of the first rails 141 and 142 may be coupled to the first guide rail 310 of the first transfer unit 300 and move reciprocally in a linear direction along the first guide rail 310.

The imaging unit 200 may photograph the substrate B loaded on the stage unit 100. The imaging unit 200 may include a scan camera 210, a focus adjusting driving part 220, a displacement sensor 230, and an illuminating part 240.

The scan camera 210 may photograph a surface of the substrate B to obtain first image information I1. The scan camera 210 may also photograph an opposite surface of the substrate B to obtain second image information I2. The imaging unit 200 may transmit the first and second image information I1 and I2 to the controller 500. In an embodiment, only one scan camera 210 may be provided. In another embodiment, a plurality of scan cameras 210 may be provided to obtain the first and second image information. The first and second image information I1 and I2 may be images photographed by the imaging unit 200.

The scan camera 210 may be installed at one side of the stage unit 100. In an embodiment, the scan camera 210 may be on an upper side of the stage section 110. In another embodiment, the scan camera 210 may be at a different position, e.g., on a lower side, a right side, or a left side of the stage section 110.

The illuminating part 240 may be in proximity to the scan camera 210. In an embodiment, the illuminating part 240 may be adjacent to and spaced apart from the scan camera 210. In another embodiment, the illuminating part 240 may be fixed in a different position, e.g., installed at the scan camera 210. The illuminating part 240 may irradiate light toward the substrate B in order to allow the scan camera 210 to obtain a clear image.

The displacement sensor 230 may measure the distance between the scan camera 210 and substrate B. The displacement sensor 230 may include a laser sensor, an ultrasonic sensor, or another type of sensor. In an embodiment, the displacement sensor 230 may fixed to the scan camera 210. The displacement sensor 230 may include a light emitting part and a light receiving part. The light emitting part may irradiate a laser beam toward the substrate B. The laser beam may reflect from the substrate B and then be received by the light receiving part. The displacement sensor 230 may measure the distance between the scan camera 210 and the substrate B, for example, by measuring the light traveling time from the light emitting part to the light receiving part.

The focus adjusting driving part 220 may move the scan camera 210 based on the measured distance between the scan camera 210 and the substrate B. In an embodiment, the focus adjusting driving part 220 may move the scan camera 210 in the Z-axis direction (e.g., a vertical direction) to adjust the focus of the scan camera 210.

The first transfer unit 300 may be under the stage unit 100. The first transfer unit 300 may be configured in various ways to move the stage unit 100 in the X-axis direction. In one embodiment, the first transfer unit 300 may include a first guide rail 310 coupled to the first connecting rail section 140 of the stage unit 100, and a first transfer driving part 320 to move the stage unit 100. The first transfer unit 300 may further include a second connecting rail section 330 connected to the second transfer unit 400, as illustrated in FIG. 1C.

The first guide rail 310 may include two first rail grooves 311 and 312 which receive the first rails 141 and 142 of the first connecting rail section 140. For example, the first guide rail 310 may include a first guide body which extends lengthwise in the X-axis direction. The first rail grooves 311 and 312 may be formed at opposing sides of the first guide body. Each of the first rail grooves 311 and 312 may extend in the X-axis direction. The first rail grooves 311 and 312 may be arranged parallel to and spaced apart from each other in the Y-axis direction. A first point 340 may correspond to one end of each of the first and second rail grooves 311 and 312. A second point 350 may correspond to the opposite end of each of the first and second rail grooves 311 and 312, as illustrated in FIG. 1B.

The first transfer driving part 320 may move the stage unit 100 along the first guide rail 310. For example, the first transfer driving part 320 may move the stage unit 100 reciprocally in a linear direction between the first point 340 and second point 350.

The second connecting rail section 330 may be under the first guide rail 310. The second connecting rail section 330 may be coupled to a second guide rail 410 of the second transfer unit 400. As illustrated in FIG. 1C, the second connecting rail section 330 may include two second rails 331 and 332 that extend in the Y-axis direction. The second rails 331 and 332 may be arranged parallel to and spaced apart from each other in the X-axis direction. Each of the second rails 331 and 332 may be coupled to the second guide rail 410 of the second transfer unit 400 and move reciprocally in a linear direction along the second guide rail 410.

The second transfer unit 400 may be under that stage unit 100. In an embodiment, the second transfer unit 400 may be below the first transfer unit 300. In another embodiment, the second transfer unit 400 may be at a different position, e.g., above the first transfer unit 300. The second transfer unit 400 may move the stage unit 100 in the Y-axis direction. In an embodiment, the second transfer unit 400 may include the second guide rail 410 coupled to the second connecting rail section 330 of the first transfer unit 300 and a second transfer driving part to move the first transfer unit 300.

The second guide rail 410 may include second guide bodies which lengthwise extend in the Y-axis direction, and second rail grooves 411 and 412 at respective sides of the second guide bodies. The second guide bodies may be arranged parallel to and spaced apart from each other in the X-axis direction.

The second rail grooves 411 and 412 may receive the second rails 331 and 332. The second rails 331 and 332 may move reciprocally in the Y-axis direction along the second rails grooves 411 and 412. The second rail grooves 411 and 412 may extend in the Y-axis direction and may have, for example, a linear shape. The second rail grooves 411 and 412 may be arranged parallel to and spaced apart from each other in the X-axis direction. A third point 420 may correspond to one end of each of the second rail grooves 411 and 412, and a fourth point 430 may correspond to an opposite end of each of the second rail grooves 411 and 412, as illustrated in FIG. 1C.

The second transfer driving part may move the first transfer unit 300 along the second guide rail 410. Accordingly, the stage unit 100 on the first transfer unit 300 may also move in the Y-axis direction. For example, the first transfer driving part 320 may move the stage unit 100 reciprocally in a linear direction between the third point 420 and the fourth point 430.

The controller 500 may control the stage unit 100, the imaging unit 200, the first transfer unit 300, and the second transfer unit 400. In an embodiment, the controller 500 may control the driving part 115, the rotational driving section 120, the focus adjusting driving part 220, the illuminating part 240, the first transfer driving part 320, and the second transfer driving part. The controller 500 may receive the first and second image information I1 and I2 from the imaging unit 200.

The display unit 600 may display image information from the controller 500. For example, the display unit 600 may display an overlapped image of the first and second image information I1 and I2 and/or may display information I3 about a prediction of a mark location. The display unit 600 may include a display panel which has, for example, a touch input function.

Figure 5:
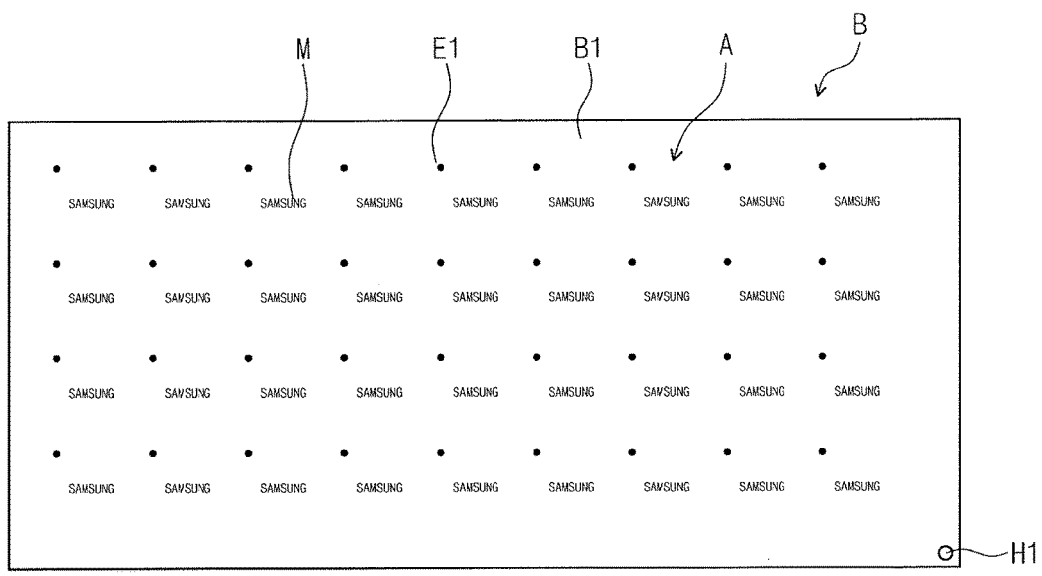
FIG. 5 illustrates an embodiment of a surface of a substrate on the stage.
Figure 6:
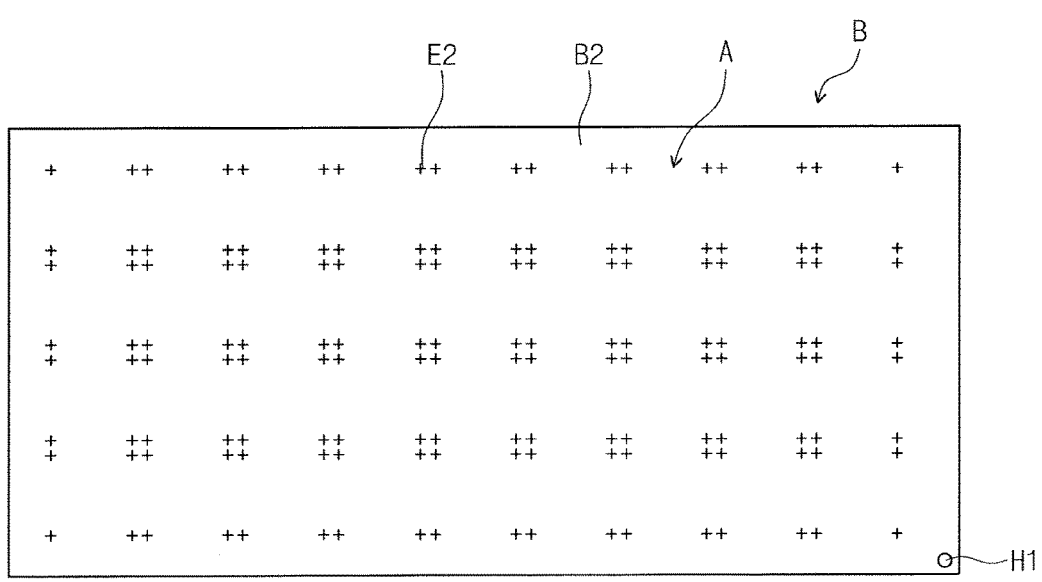
FIG. 6 illustrates an embodiment of an opposite surface of the substrate.
Figure 7:
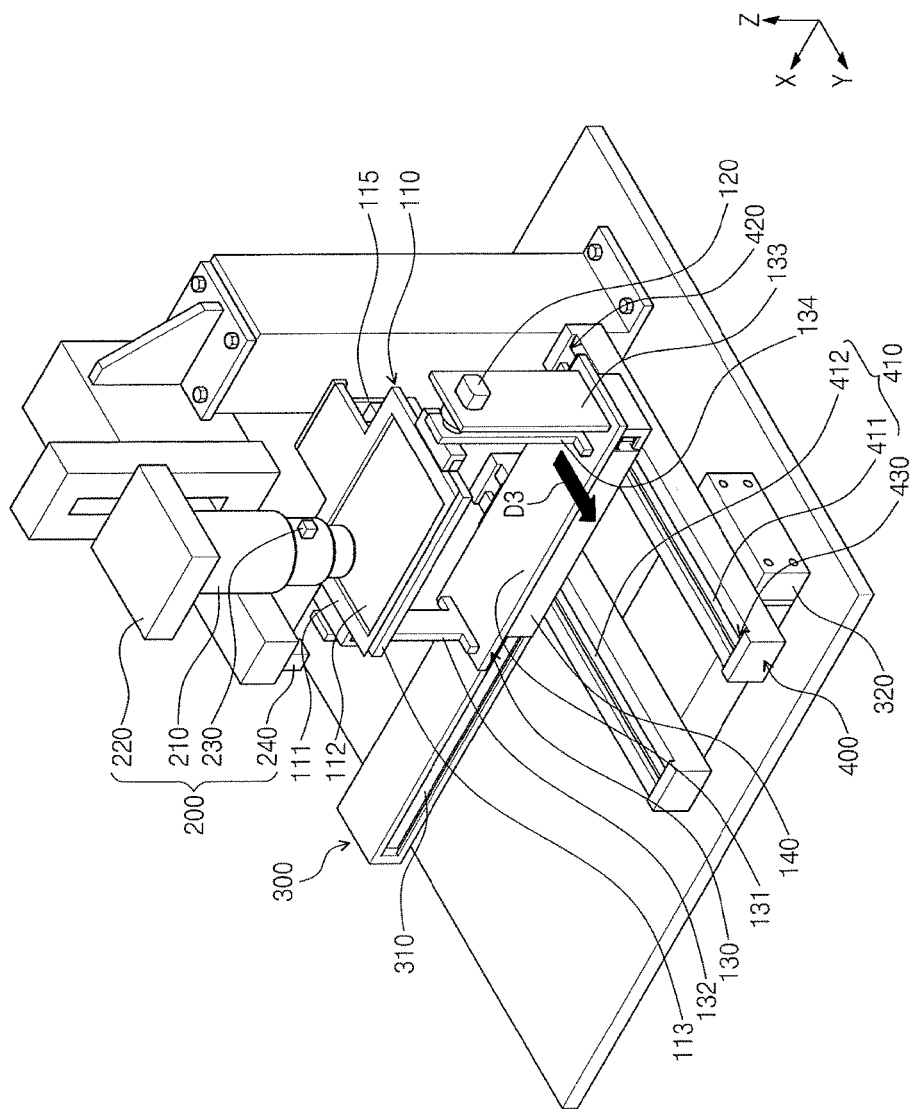
FIGS. 7 to 10 illustrate an embodiment for loading a substrate on the stage.

FIGS. 5 and 6 illustrate examples of opposing surfaces B1 and B2 of a substrate on the stage unit in FIG. 3. Referring to FIGS. 3, 5, and 6, the substrate B loaded on the stage unit 100 may include a plurality of electronic device regions A. Each of the electronic device regions A may include a mark M and a reference indication E1 on the surface B1 of the substrate B and a sawing indication E2 on the surface B2 opposite the surface B1 of the substrate B.

The marks M, the reference indications E1, and the sawing indications E2 may be provided on the substrate B, for example, by performing a laser etch or another type of marking operation. The electronic device regions A may be cut and separated from each other by a cutting tool to produce a plurality of unit electronic devices.

The substrate B may include one or more reference halls H1 passing therethrough. The substrate B may have a rectangular shape or another shape.

The reference indication E1 may have a dot shape or another shape. In one embodiment, a single sawing indication E2 may include a plurality of sawing marks. The sawing marks may be respectively disposed on vertices of the electronic device region A. In an embodiment, the sawing indication E2 may include four cross-typed sawing marks, and the electronic device region A may have a regular square shape. In this case, the four sawing marks may be respectively positioned on the four vertices of the electronic device region A. The mark M may include a company symbol, a trademark, or another type of mark. The mark M may be, for example, on a middle portion or another portion of the electronic device region A.

Figure 17:
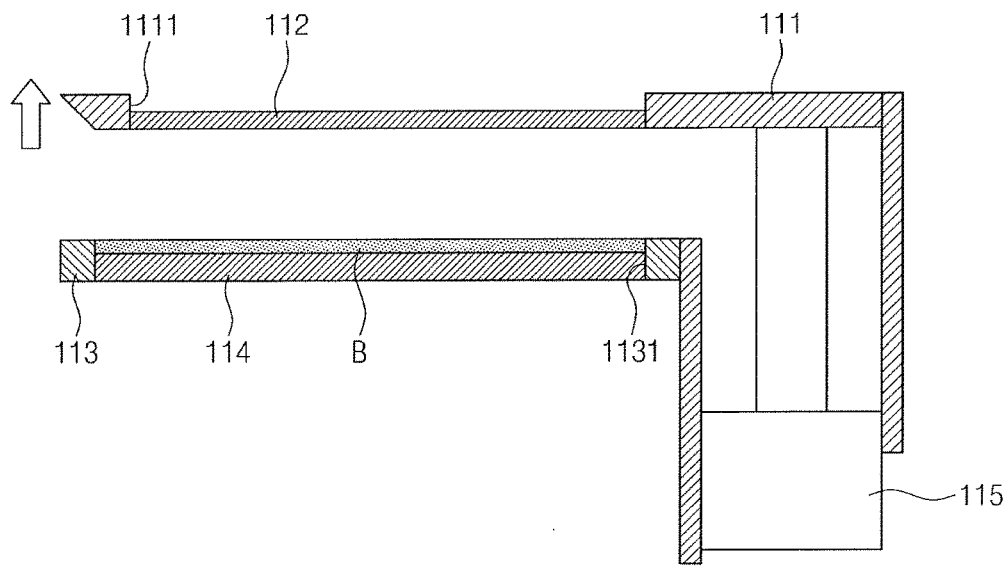
FIGS. 17 and 18 illustrate an embodiment for unloading the substrate from the stage.
Figure 18:
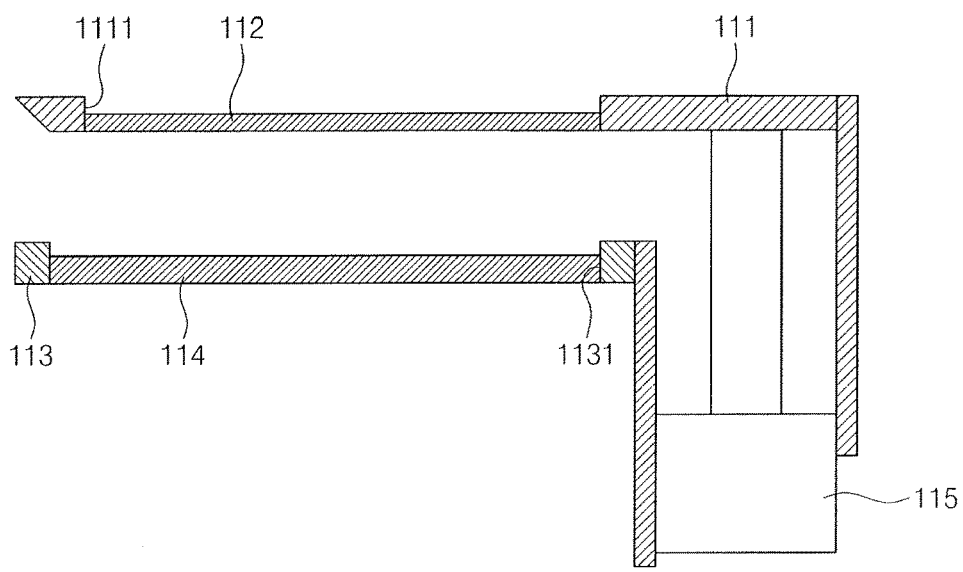

FIGS. 7 to 10 illustrate an embodiment for loading a substrate on the stage unit of FIG. 1A. FIGS. 11 to 16 illustrate an embodiment for obtaining first and second image information using the imaging unit of FIG. 1A. FIGS. 17 and 18 illustrate an embodiment for unloading a substrate from the stage unit of FIG. 1A. There will also be explained a method for predicting the location of a mark M on the electronic device region A, which is to be cut and separated, for example, using apparatus 10 for predicting the location of a mark with reference to FIGS. 2 and 5 to 18, Referring to FIGS. 2 and 7, the controller 500 may control the second transfer driving part of the second transfer unit 400 to move the stage unit 100 and the first transfer unit 300 toward the fourth point 430 from the third point 420 of the second rail grooves 411 and 412. The stage unit 100 may then shift in a third direction D3 along the second guide rail 410. The third direction D3 may be a direction proceeding toward the fourth point 430 from the third point 420. The third direction D3 may be, for example, parallel to the Y-axis direction.

Figure 8:
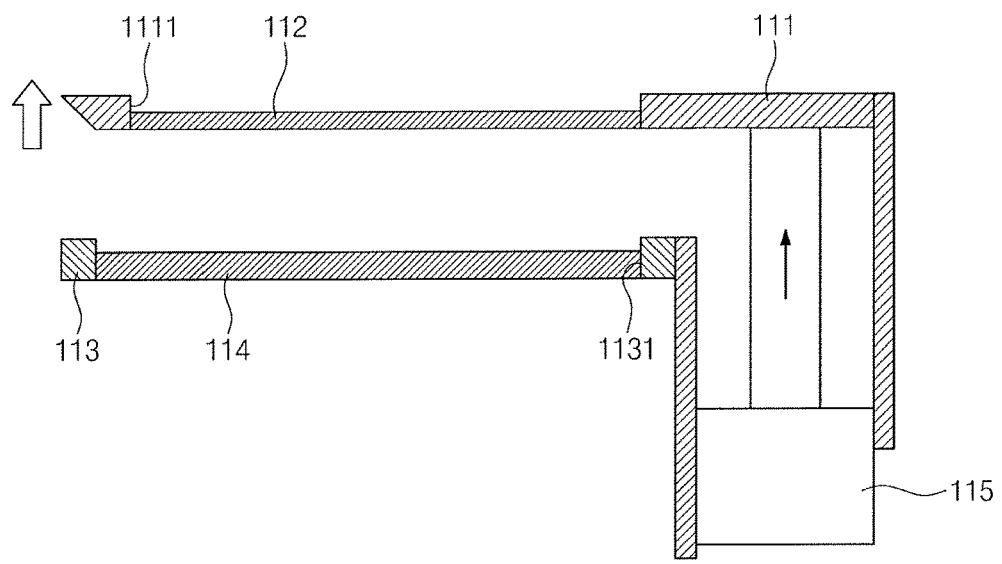

Referring to FIGS. 2, and 8 to 10, a substrate transfer may put the substrate B in place on one of the first or second transparent plates 112 and 114. The controller 500 may move at least one of the first or second transparent plates 112 and 114 to bring the substrate B into contact with the other of the first or second transparent plates 112 and 114. After the stage unit 100 is positioned at the fourth point 430 of the second rail grooves 411 and 412, the controller 500 may control the driving part 115 of the stage unit 100 to move the first bracket 111 upward, as illustrated in FIG. 8. The first bracket 111 may therefore rise upward from the second bracket 113.

Figure 9:
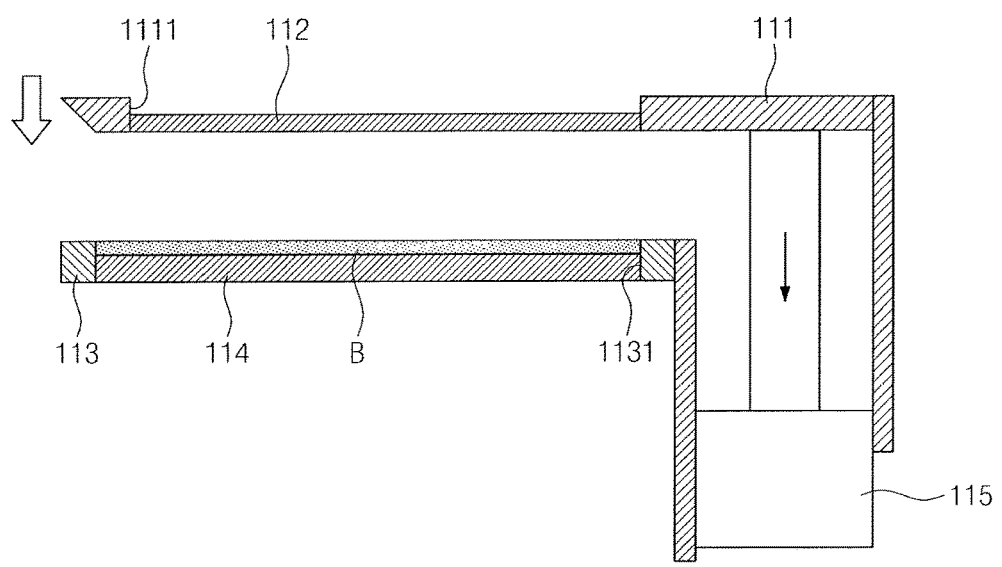
Figure 10:
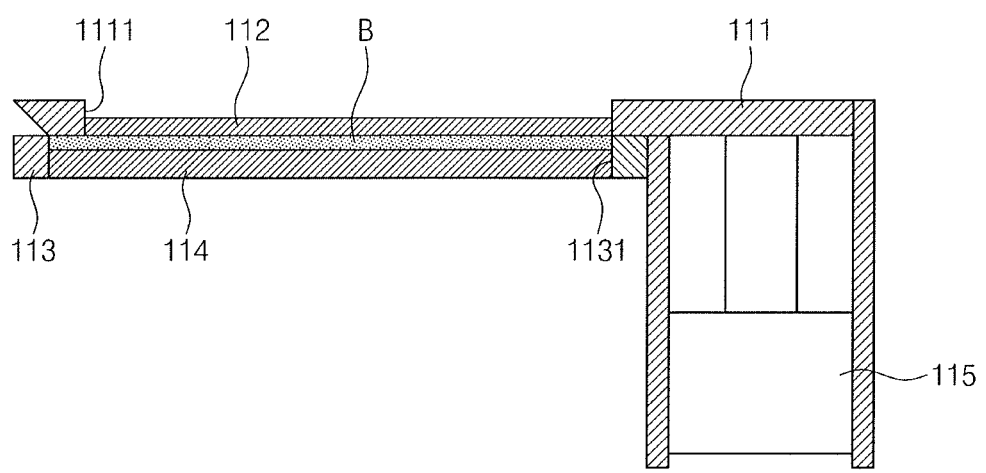

The substrate transfer may put the substrate B in place on the second transparent plate 114, as illustrated in FIG. 9. The second transparent plate 114 may therefore contact the bottom surface of the substrate B. After the substrate B is placed on the second transparent plate 114, the controller 500 may control the driving unit 115 to move the first bracket 111 downward. As the first bracket 111 falls down to the second bracket 113, the top surface of the substrate B may contact the first transparent plate 112 be fixed to the first bracket 111. The substrate B may therefore be immovably disposed between the first and second transparent plates 112 and 114, as illustrated in FIG. 10. Thus, the substrate B including the plurality of electronic device regions may be loaded on the stage unit 100.

Figure 11:
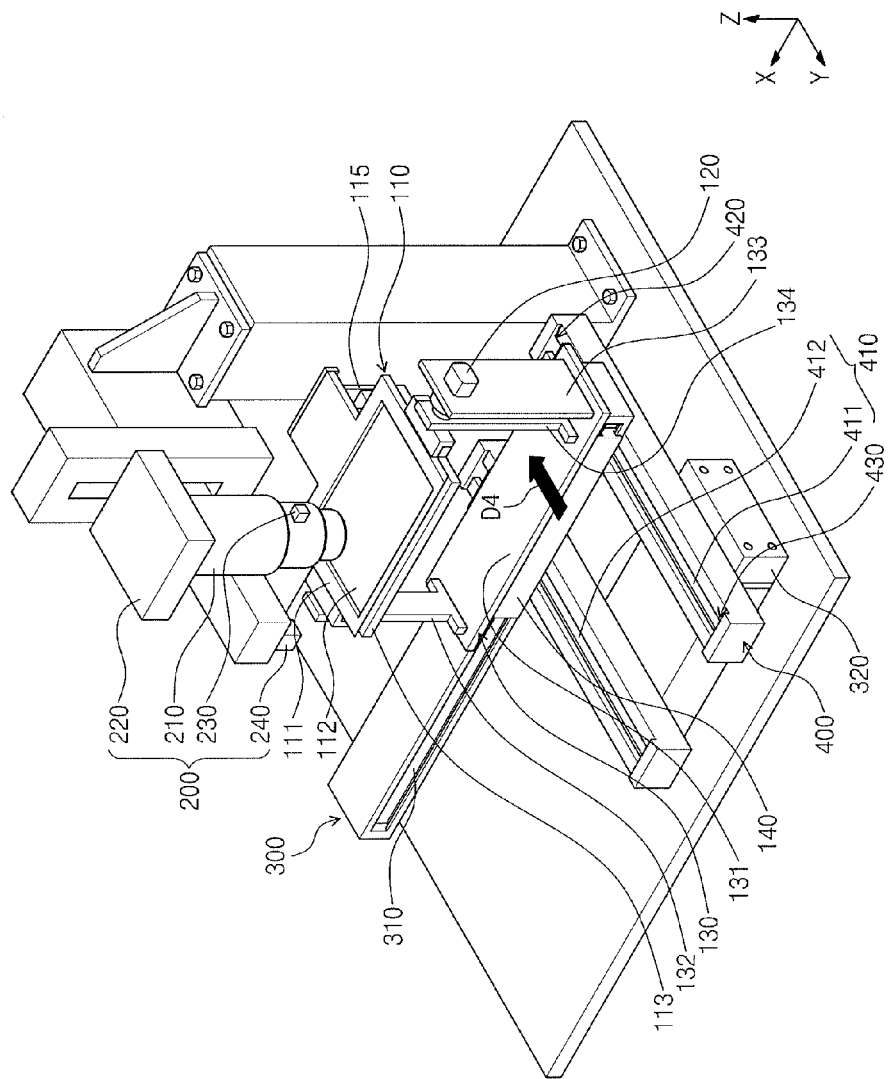
FIGS. 11 to 16 illustrate an embodiment for obtaining image information.

Referring to FIGS. 2 and 11, after the substrate B is loaded on the stage unit 100, the controller 500 may control the second transfer driving part to move the stage unit 100 and the first transfer unit 300 toward the third point 420 from the fourth point 430 of the second rail grooves 411 and 412. The stage unit 100 may then shift in a fourth direction D4 along the second guide rail 410. The fourth direction D4 may be a direction extending from the fourth point 430 to the third point 420. The fourth direction D4 may be parallel to the Y-axis direction.

Figure 12:
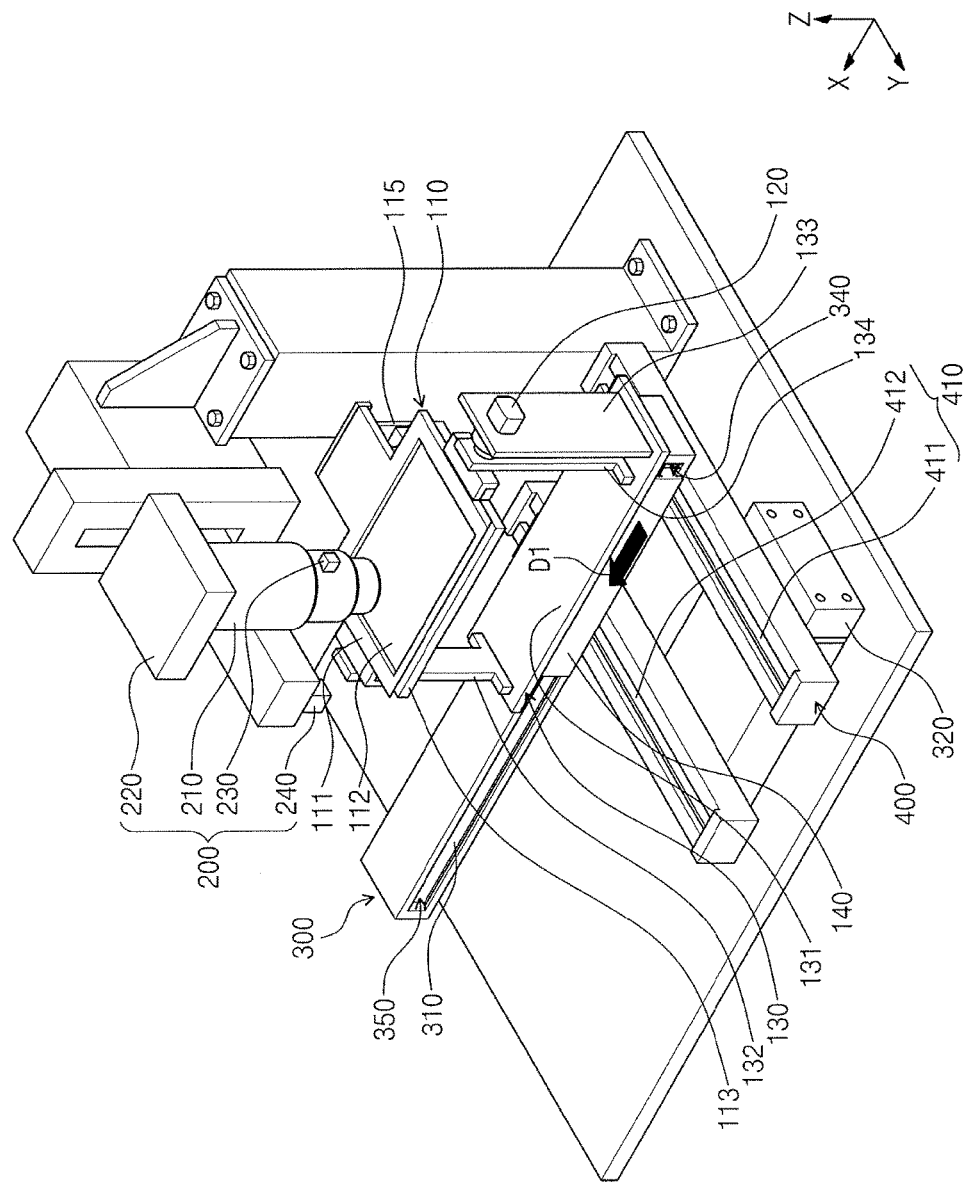

Referring to FIGS. 2, 5, and 12, after the stage unit 100 is positioned at the third point 420 of the second rail grooves 411 and 412, the controller 500 may control the first transfer driving part 320 to move the stage unit 100 toward the second point 350 of the first rail grooves 311 and 312. The stage unit 100 may then shift in a first direction D1 along the first guide rail 310. The first direction D1 may be a direction extending from the first point 340 toward the second point 350. The first direction D1 may be parallel to the X-axis direction.

The imaging unit 200 may photograph the top surface of the substrate B loaded on the stage unit 100, which is shifting in the first direction D1. The imaging unit 200 may therefore photograph the top surface of the electronic device region A of the substrate B. As a result, the imaging unit 200 may obtain the first image information I1.

The imaging unit 200 may transmit the first image information I1 to the controller 500. In an embodiment, the stage unit 100 may shift at a speed sufficient to allow the imaging unit 200 to precisely photograph the top surface of the electronic device region A of the substrate B. In one embodiment, the imaging unit 200 may photograph the top surface of the electronic device region A of the substrate B loaded on the stage unit 100, when in a stationary state.

Figure 13:
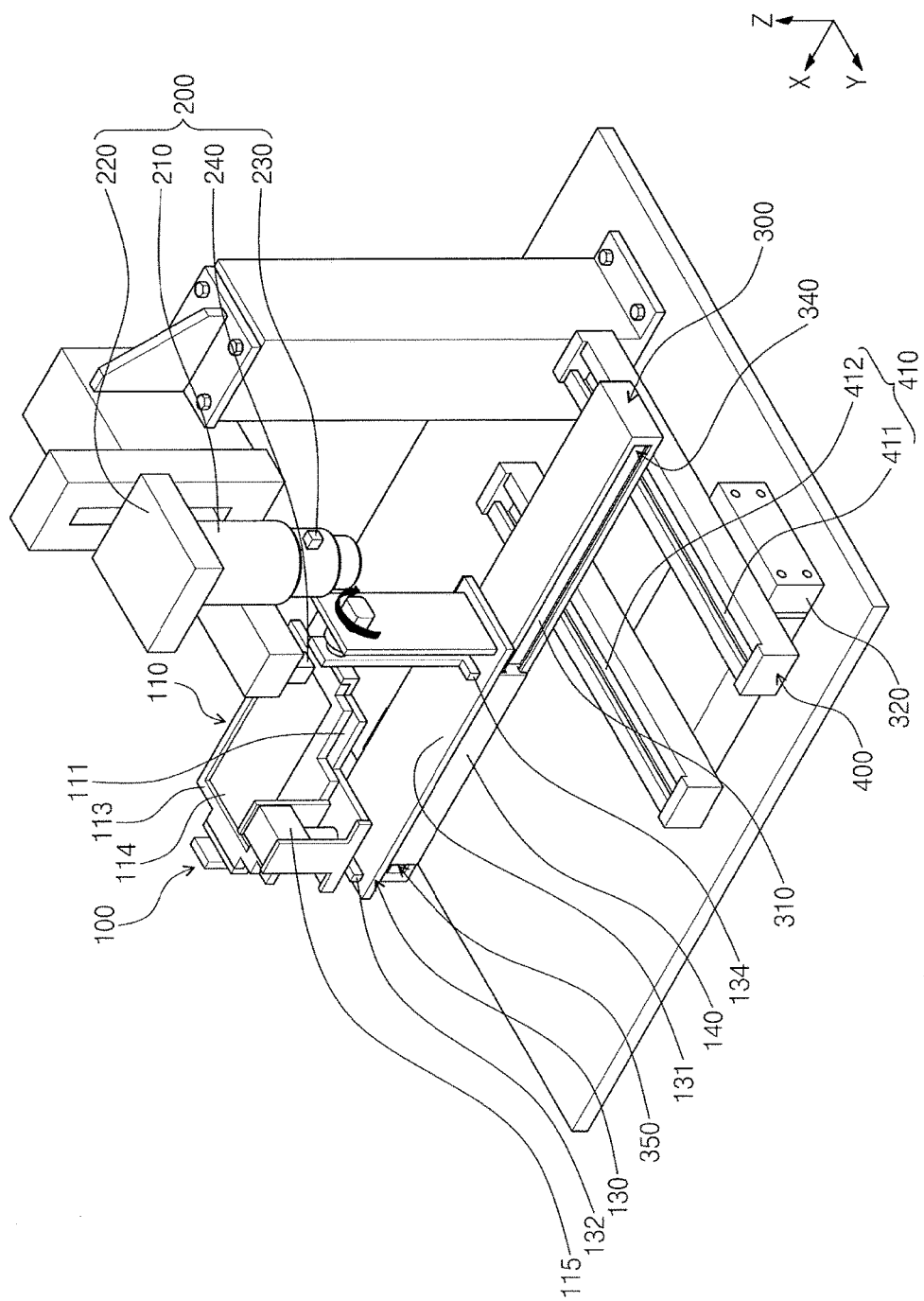

Referring to FIGS. 2, 6, and 13, after the stage unit 100 is positioned at the second point 350 of the first rail grooves 311 and 312, the controller 500 may control the rotational driving section 120 to rotate the stage section 110. For example, the controller 500 may control the rotational driving section 120 to rotate the second bracket 113 at about 180°. The bottom surface of the substrate B may then be exposed to the imaging unit 200 above the stage unit 100. Thus, after the imaging unit 200 obtains one of the first or second image information I1 and I2, the controller 500 may allow the stage unit 100 to rotate the substrate B at about 180°.

Figure 14:
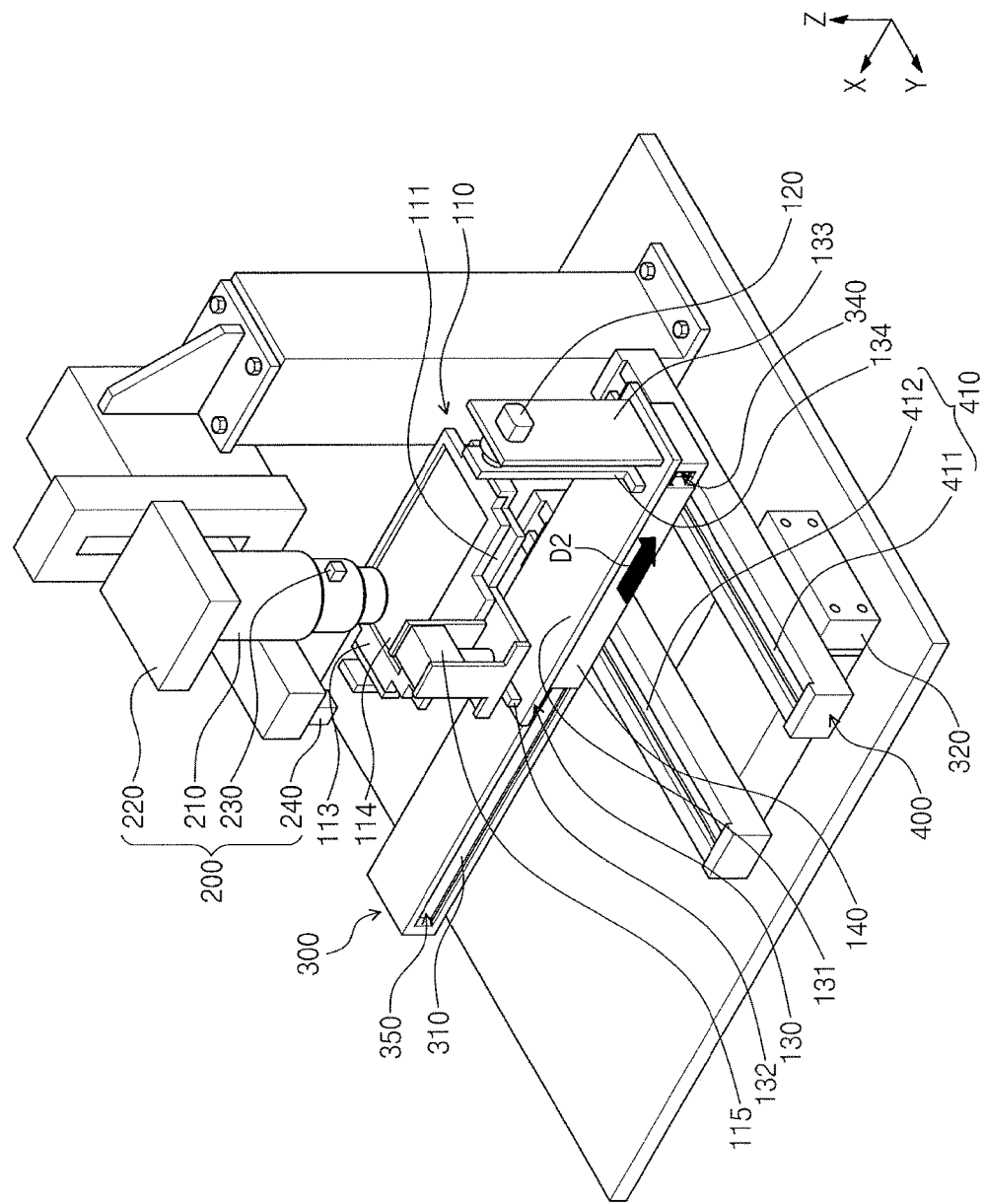

Referring to FIGS. 2 and 14, after the stage section 110 is rotated, the controller 500 may control the first transfer driving part 320 to move the stage unit 100 toward the first point 340 of the first rail grooves 311 and 312. The stage unit 100 may then shift in a second direction D2 along the first guide rail 310. The second direction D2 may be a direction that extends from the second point 350 to the first point 340. The second direction D2 may be parallel to the X-axis direction and opposite to the first direction D1 of FIG. 12.

The imaging unit 200 may photograph the bottom surface of the substrate B loaded on the stage unit 100, which is shifting in the second direction D2. Thus, the imaging unit 200 may photograph a bottom surface of the electronic device region A of the substrate B. As a result, the imaging unit 200 may obtain the second image information I2. The imaging unit 200 may transmit the second image information I2 to the controller 500. In an embodiment, the stage unit 100 may shift at a speed sufficient to allow the imaging unit 200 to precisely photograph the bottom surface of the electronic device region A of the substrate B. In one embodiment, the imaging unit 200 may photograph the bottom surface of the electronic device region A of the substrate B loaded on the stage unit 100, which is in a stationary state.

Figure 15:
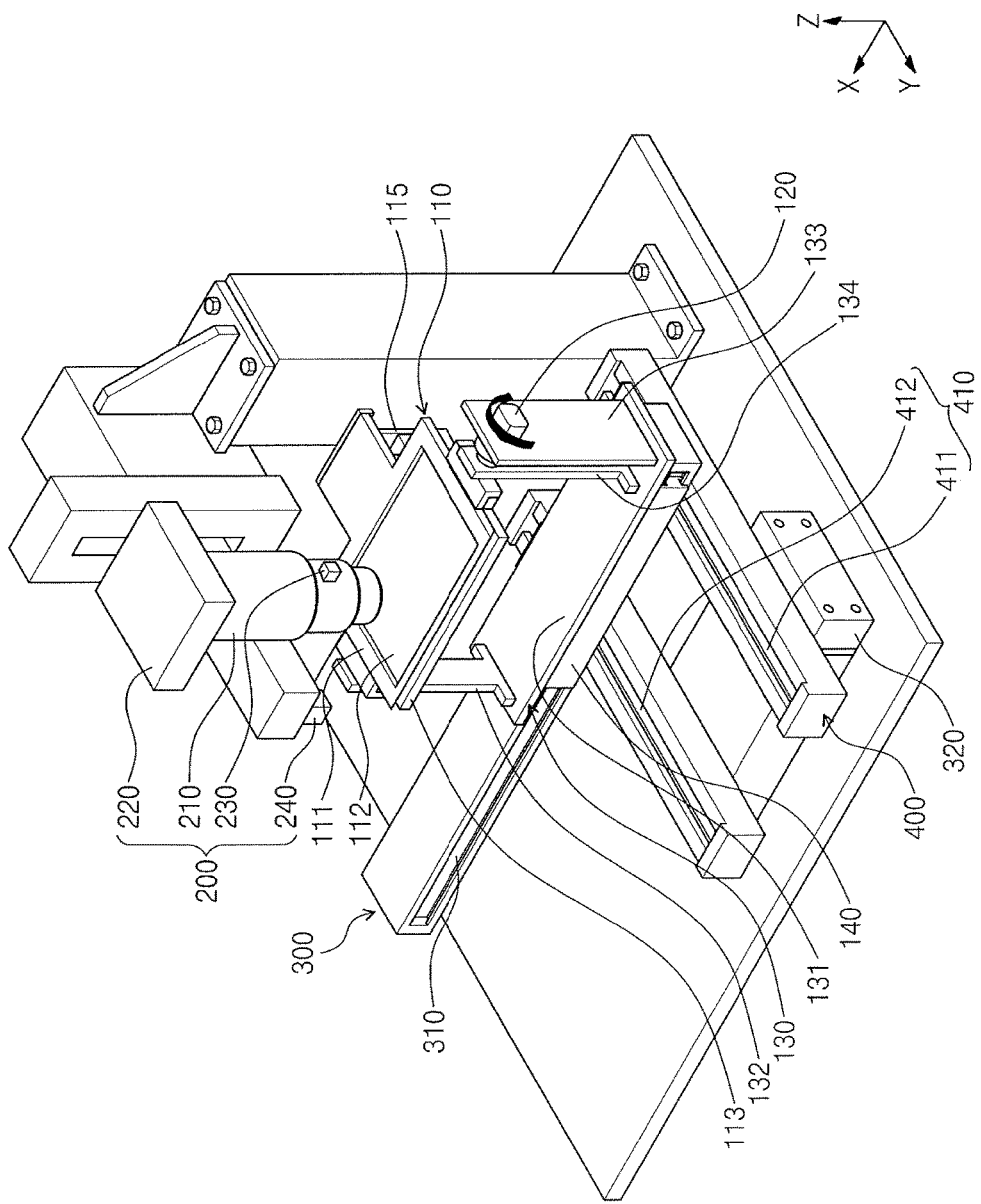

Referring to FIGS. 2 and 15, after the stage unit 100 is positioned at the first point 340 of the first rail grooves 311 and 312, the controller 500 may control the rotational driving section 120 to rotate the stage section 110. For example, the controller 500 may control the rotational driving section 120 to rotate the second bracket 113, for example, at about 180°.

Figure 16:
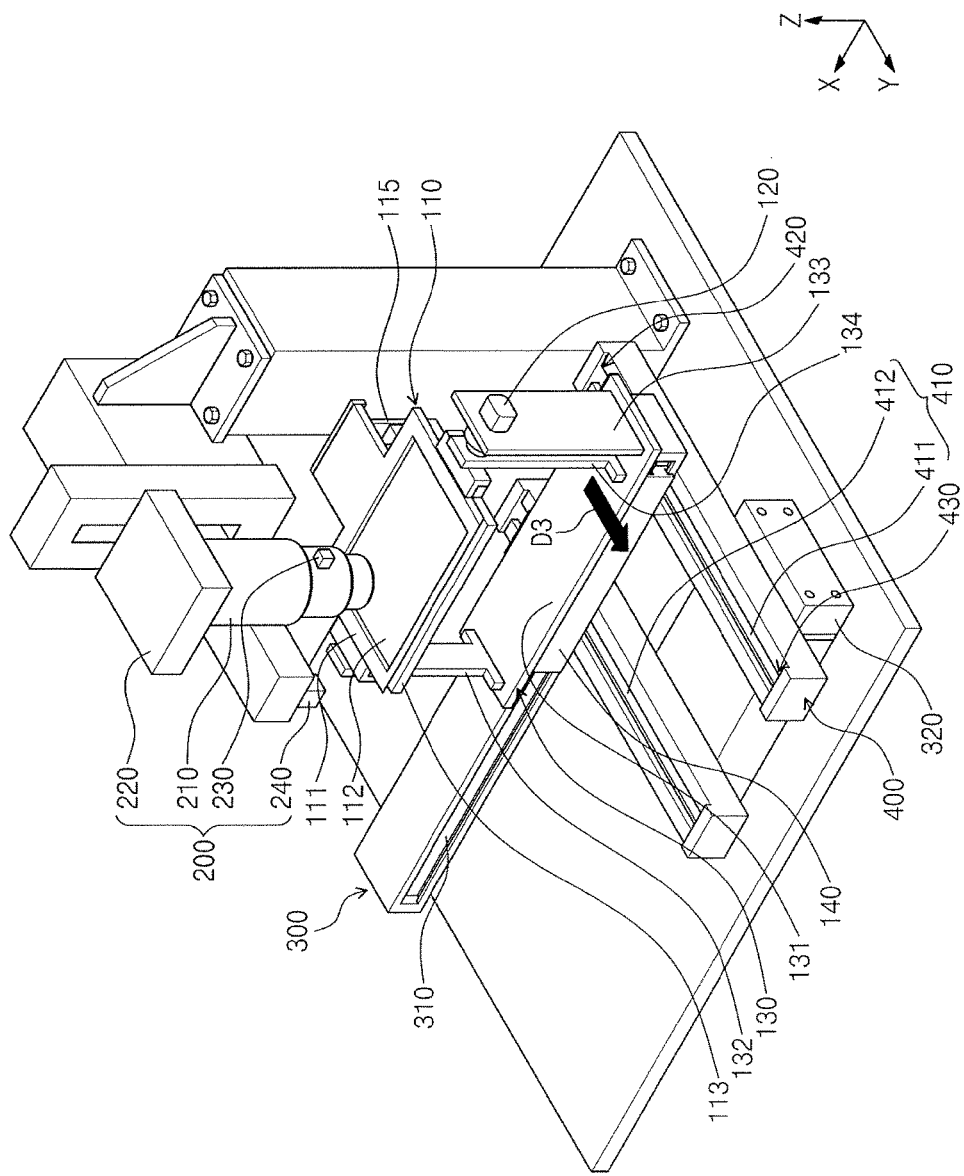

Referring to FIGS. 2 and 16, the controller 500 may control the second transfer driving part to move the stage unit 100 toward the fourth point 430. The stage unit 100 may then move in the third direction D3 along the second guide rail 410.

Referring to FIGS. 2, 17, and 18, after the stage unit 100 is positioned at the fourth point 430 of the second rail grooves 411 and 412, the controller 500 may control the driving part 115 to move the first bracket 111 upward. The substrate B may then be set free from the locking position between the first and second transparent plates 112 and 114 of the stage unit 100. Therefore, the substrate B may be unloaded from the stage unit 100. The substrate transfer may load a new substrate on the second transparent plate 114 after unloading the substrate B from the stage unit 100.

Figure 19:
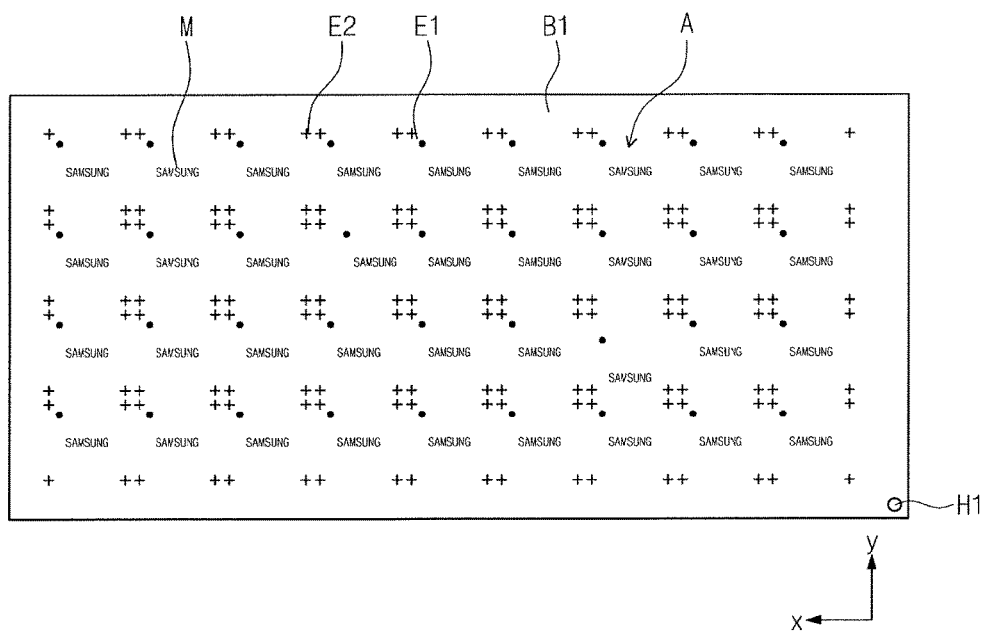
FIG. 19 illustrates an example of an overlapped image.
Figure 20:
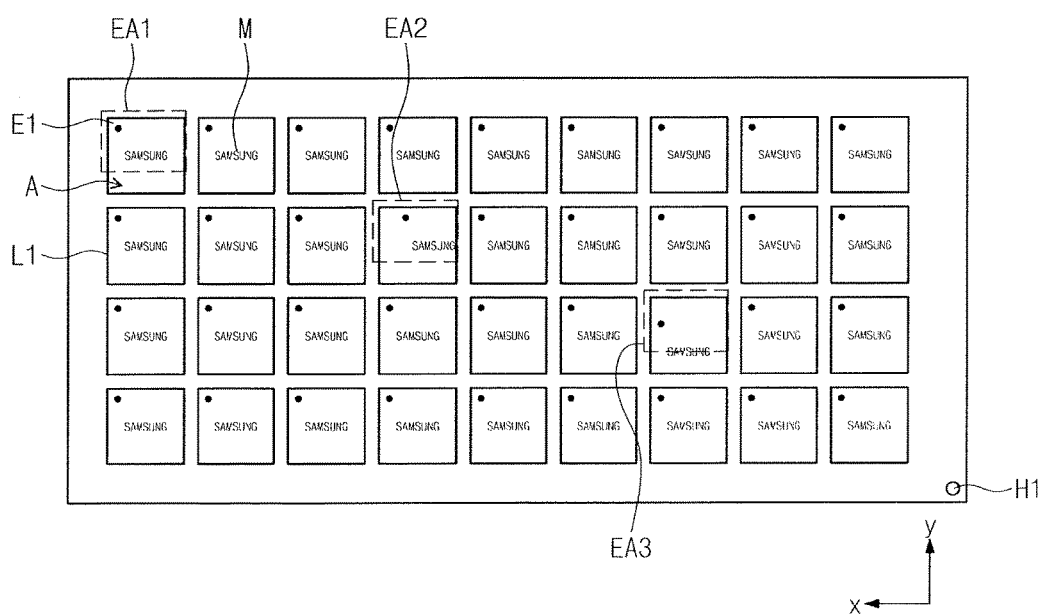
FIG. 20 illustrates an example of a sawing indication in the image of FIG. 19.

FIG. 19 illustrates an example of an overlapped image of the first and second image information obtained by the imaging unit of FIG. 1A. FIG. 20 illustrates the image of FIG. 19 including a sawing indication thereon.

Referring to FIGS. 2, 19, and 20, the controller 500 may receive first and second image information I1 and I2 from the imaging unit 200. The first image information I1 may be an image obtained by photographing the surface B1 of the substrate B, for example, as illustrated in FIG. 5. The second image information I2 may be an image obtained by photographing the opposite surface B2 of the substrate B, as illustrated in FIG. 6.

The controller 500 may extract a sawing line L1 using the sawing indication E2 included in the second image information I2. In an embodiment, the controller 500 may overlap the first and second image information I1 and I2 using a position of the reference hall H1 included in the received first image information I1 and a position of the reference hall H1 included in the received second image information I2.

For example, the controller 500 may calculate X-Y coordinates of the sawing indication E2 from each position of the sawing indications E2 with respect to the reference hall H1 in the second image information I2. The controller 500 may also calculate X-Y coordinates of the reference indications E1 from each position of the reference indications E1 with respect to the reference hall H1 in the first image information I1. In an embodiment, the X-Y coordinates of the sawing indication E2 may include an X-Y coordinates of a center point of each of the sawing marks. The X-Y coordinates of the reference indication E1 may represent a center point of the reference indication E1.

The controller 500 may overlap each of the sawing indications E2 with the first image information I1 using calculated X-Y coordinates of the sawing and reference indications E1 and E2. The sawing indications E2 may then be displayed on the first image information I1.

The controller 500 may extract the sawing line L1 using the sawing indication E2 after overlapping the first and second image information I1 and I2. For example, the controller 500 may extract the sawing line L1 from the sawing indication E2. Thus, the sawing line L1 may be displayed on the first image information I1. The sawing line L1 may correspond to a line that directly connects the plurality of sawing marks to each other in the sawing indication E2. The sawing line L1 may also correspond to a boundary line of the electronic device region A. A cutting tool may cut the electronic device region A along the sawing line L1. The reference indication E1 and the mark M may be positioned within the sawing line L1.

In one embodiment, the controller 500 may extract the sawing line L1 using the X-Y coordinates of the sawing indication E2. The controller 500 may overlap the first image information I1 with the second image information I2 from which the sawing line L1 is extracted. When the first and second image information I1 and I2 overlap, the controller 500 may use the position of the reference hall H1 in first image information I1 and the position of the reference hall H1 in second image information I2. In other words, after extracting the sawing line L1, the controller 500 may calculate X-Y coordinates of the sawing lines L1 based on the reference hall H1 and X-Y coordinates of the reference indications E1 based on the reference hall H1. The controller 500 may overlap the sawing lines L1 with the first image information I1 using the X-Y coordinates of the sawing lines L1 and the reference indications E1. As a result, the sawing lines L1 may be displayed on the first image information I1 and the reference indications E1 may be displayed on the second image information I2.

Figure 21:
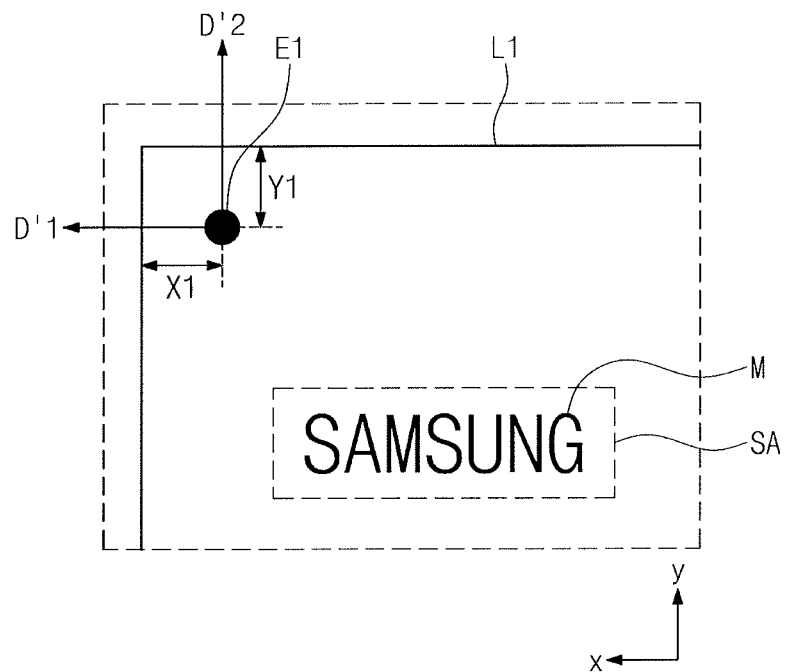
FIG. 21 illustrates an example of an enlarged area EA1 in FIG. 20.
Figure 22:
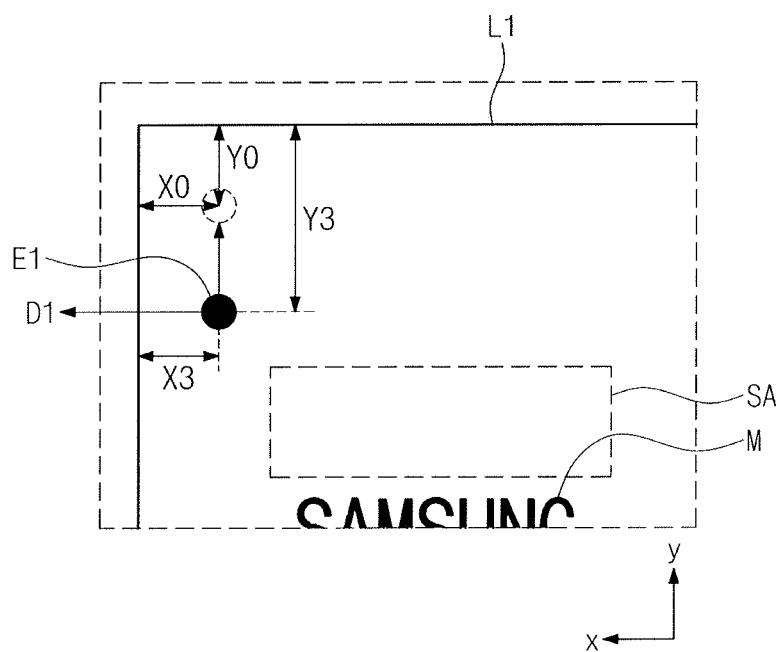
FIG. 22 illustrate an example of an enlarged area EA2 in FIG. 20.
Figure 23:
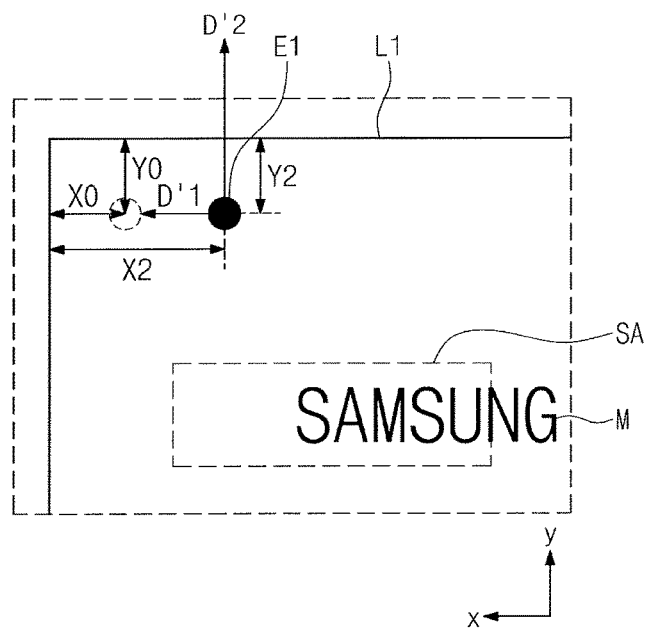
FIG. 23 illustrates an example of an enlarged area EA3 in FIG. 20.
Figure 24:
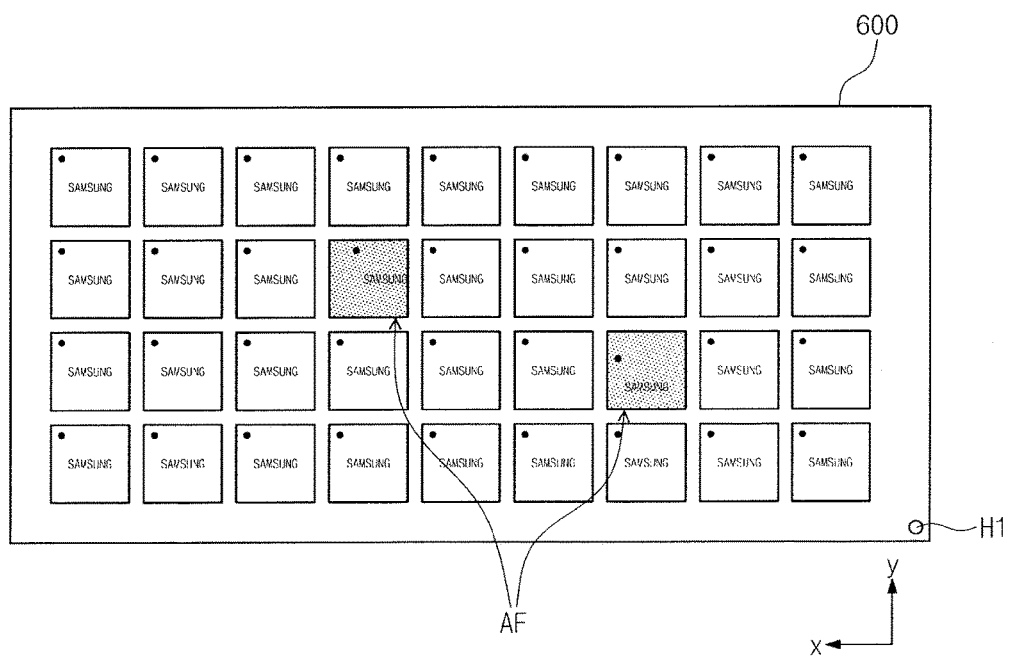
FIG. 24 illustrates an embodiment of a display.

FIG. 21 illustrates an example of an enlarged area EA1 of FIG. 20. FIG. 22 illustrates an example of an enlarged area EA2 of FIG. 20. FIG. 23 illustrates an example of an enlarged area EA3 of FIG. 20. FIG. 24 illustrates an embodiment of the display unit of FIG. 2 for displaying information for predicting a mark location.

Referring to FIGS. 2 and 21 to 24, the controller 500 may use the reference indication E1 and the sawing line L1 to calculate a spaced distance therebetween. In an embodiment, the controller 500 may calculate a first spaced distance between the reference indication E1 and the sawing line L1 in a first direction D'1. The controller 500 may calculate a second spaced distance between the reference indication E1 and the sawing line L1 in a second direction D'2 different from the first direction D'1. In an embodiment, the first direction D'1 may be perpendicular to the second direction D'2. The first direction D'1 may be parallel to the X-axis direction. The second direction D'2 may be parallel to the Y-axis direction. The first direction D'1 may be the same direction as one of the first direction D1 of FIG. 12 or the second direction D2 of FIG. 14. The second direction D'2 may be the same direction as one of the third direction D3 of FIG. 7 or the fourth direction D4 of FIG. 11.

The controller 500 may predict the position of the mark M on each of the electronic device regions A that will be cut and separated from each other along the sawing line L1. The position of the mark M may be predicted according to whether the calculated spaced distance corresponds to a predetermined reference distance. The spaced distance may correspond, for example, to a predetermined reference distance and may correspond, for example, not only to the spaced distance is accordance with the reference distance but also to the spaced distance within a tolerance of the reference distance. The predetermined reference distance may include a first reference distance in the first direction D'1 between the reference indication E1 and the sawing line L1. The predetermined reference distance may also include a second reference distance in the second direction D'2 between the reference indication E1 and the sawing line L1. Accordingly, the controller 500 may determine whether the first spaced distance corresponds to the first reference distance and the second spaced distance corresponds to the second reference distance.

When the calculated spaced distance corresponds to the reference distance, the controller 500 may predict that the mark M is positioned on a predetermined reference area SA.

Referring to FIGS. 2 and 21, when a first spaced distance X1 corresponds to the first reference distance and a second spaced distance Y1 corresponds to the second reference distance, the controller 500 may predict that the mark M is positioned on the reference area SA. When the calculated spaced distance does not correspond to the reference distance, the controller 500 may predict that the mark M is positioned off the reference area SA.

Referring to FIGS. 2 and 22, when a first spaced distance X2 corresponds to a first reference distance X0 but a second spaced distance Y2 does not correspond to a second reference distance Y0, the controller 500 may predict that the mark M is positioned off the reference area SA.

Referring to FIGS. 2 and 23, when a second spaced distance Y3 corresponds to the second reference distance Y0 but a first spaced distance X3 does not correspond to the first reference distance X0, the controller 500 may predict that the mark M is positioned off the reference area SA.

Referring to FIGS. 2 and 24, information I3 about the prediction of mark location may be transmitted to the display unit 600 from the controller 500. The display unit 600 may display the information I3 to user. The user may then determine a poor electronic device region AF in which the mark M is positioned off the reference area SA, when the electronic device region A is cut to be separated from each other. The poor electronic device region AF may be displayed differently from the electronic device region A in which the mark M is positioned on the reference area SA.

Figure 25:
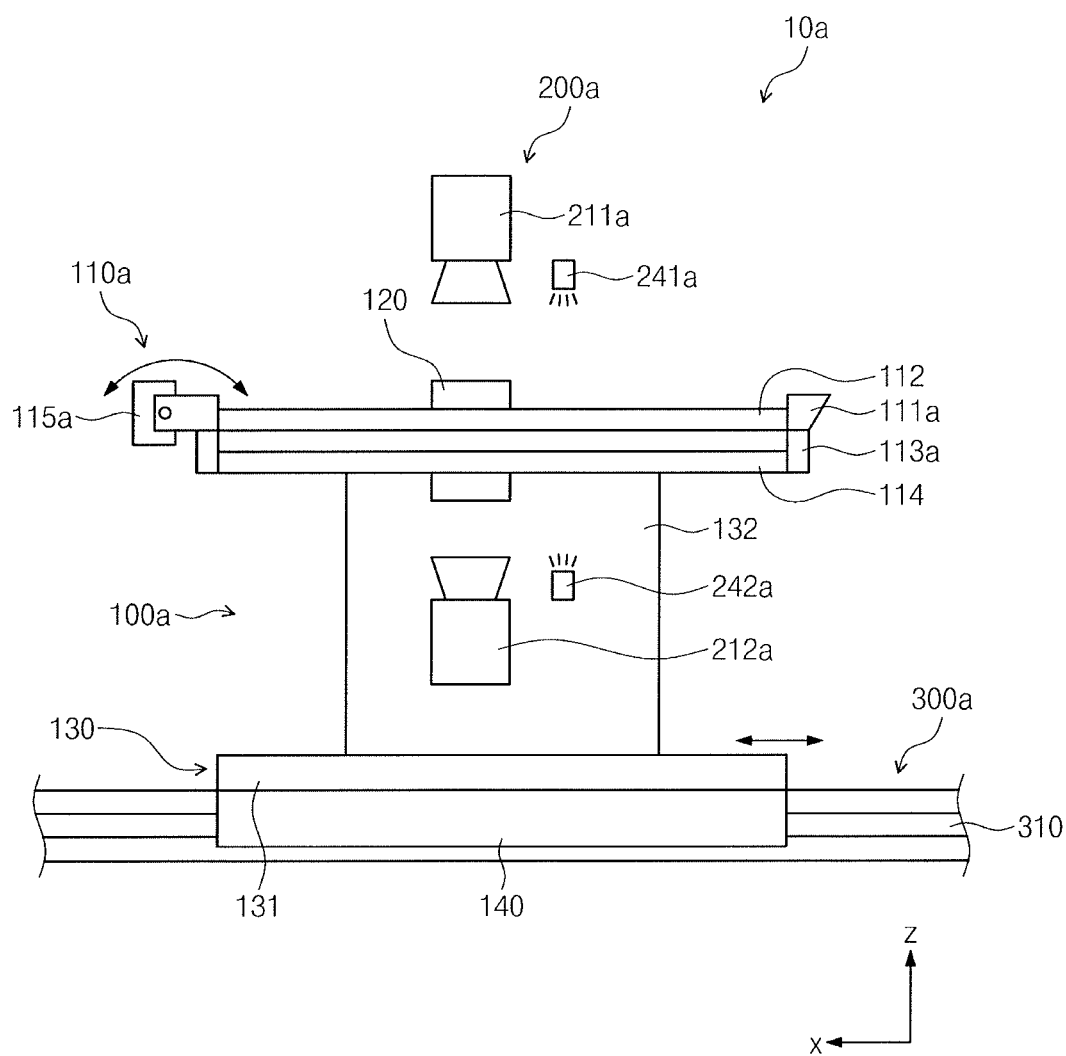
FIG. 25 illustrates another embodiment of an apparatus for predicting a mark location.
Figure 26:
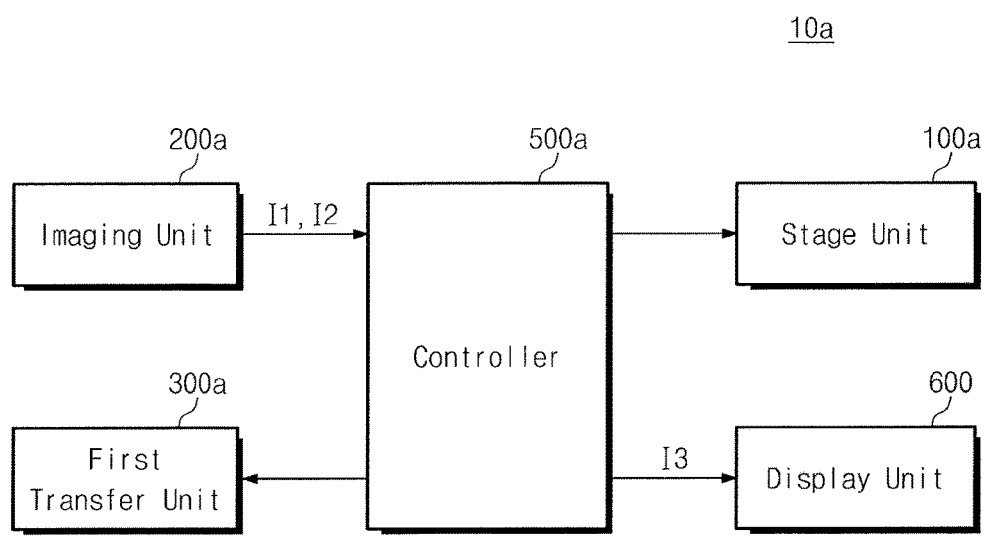
FIG. 26 illustrates another view of the apparatus in FIG. 25.

FIGS. 25 and 26 illustrate other embodiments of an apparatus for predicting the location of a mark. Referring to FIGS. 25 and 26, an apparatus 10a for predicting the location of a mark may include a stage unit 100a, an imaging unit 200a, a first transfer unit 300a, a controller 500a, and a display unit 600. The stage unit 100a may load a substrate B thereon and may include a stage section 110a, a rotational driving section 120, a stage supporting section 130, and a first connecting rail section 140.

The stage section 110a may include a first bracket 111a, a first transparent plate 112, a second bracket 113a, a second transparent plate 114, and a driving part 115a. The second bracket 113a may be on one side of the first bracket 111a. In an embodiment, the first and second brackets 111a and 113a may be parallel along an X-axis direction. The first and second brackets 111a and 113a may be hingedly connected to each other.

The driving part 115a may pivotally rotate at least one of the first or second brackets 111a and 113a. Thus, the first and second transparent plates 112 and 114 may face each other. In an embodiment, the driving part 115a may pivotally rotate the first bracket 111a within a predetermined range of angles (e.g., 180°) to allow first and second transparent plates 112 and 114 to face each other. In an embodiment, the driving part 115a may include a rotating motor.

The imaging unit 200a may photograph the substrate B loaded on the stage unit 100a. The imaging unit 200a may include a first scan camera 211a at one side of the stage section 110a, a second scan camera 212a at opposite side of the stage section 110a, a first illuminating part 241a at the one side of the stage section 110a, and a second illuminating part 242a at the opposite side of the stage section 110a. In an embodiment, the first scan camera 211a and the first illuminating part 241a may be above the stage section 110a and the second scan camera 212a and the second illuminating part 242a may be under the stage section 110a.

The first scan camera 211a may photograph a top surface of the substrate B loaded on the stage section 110a to obtain first image information I1. The second scan camera 212a may photograph a bottom surface of the substrate B loaded on the stage section 110a to obtain second image information I2.

The first illuminating part 241a may be placed in the proximity of the first scan camera 211a. The first illuminating part 241a may irradiate light toward the top surface of the substrate B. Accordingly, the first scan camera 211a may obtain a clear image.

The second illuminating part 242a may be in proximity to the second scan camera 212a. The second illuminating part 242a may irradiate light toward the bottom surface of substrate B. Accordingly, second scan camera 212a may obtain a clear image.

The first transfer unit 300a may move the stage unit 100a in the X-axis direction. The first transfer unit 300a may be placed under the stage unit 100a. In an embodiment, the first transfer unit 300a may include a first guide rail 310 connected to a first connecting rail section 140 of the stage unit 100a and a first transfer driving part for moving the stage unit 100a along the first guide rail 310.

The controller 500a may control the stage unit 100a, the imaging unit 200a, and the first transfer unit 300a. For example, the controller 500a may control the rotational driving section 120 and the driving part 115a of the stage unit 100a. The controller 500a may control the first illuminating part 241a and the second illuminating part 242a of the imaging unit 200a. The controller 500a may control the first transfer driving part of the first transfer unit 300a.

The display unit 600 may display an overlapped image of first and second image information I1 and I2, information I3 in order to predict a mark location.

Figure 27:
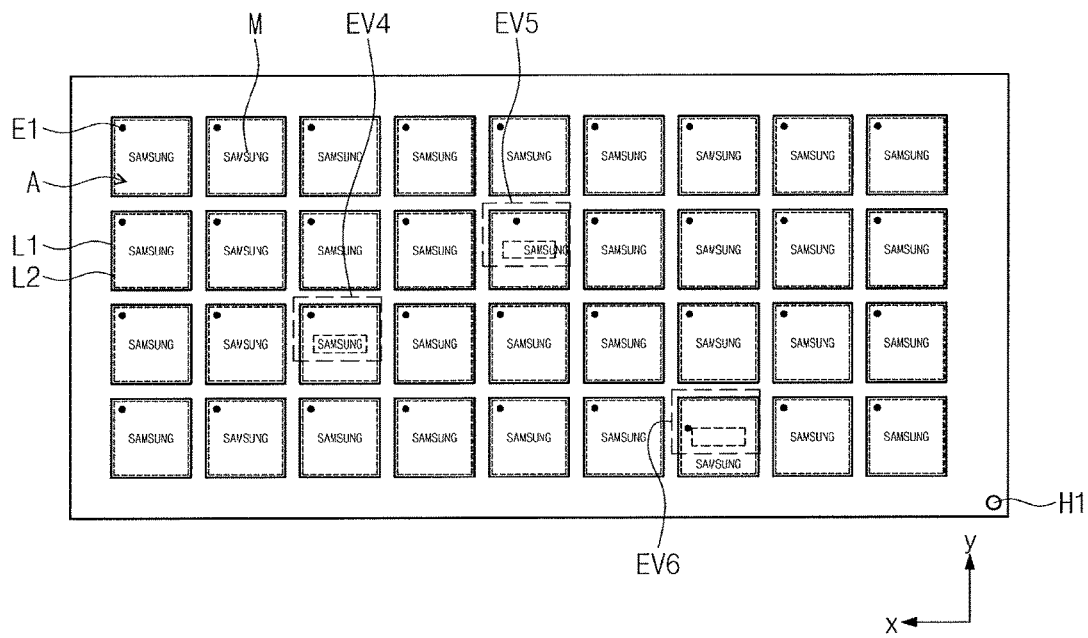
FIG. 27 illustrates an example of an overlapped image with sawing and edge lines.

FIG. 27 illustrates an overlapped image, including sawing and edge lines, of first and second image information obtained by the imaging unit of FIG. 25. Referring to FIGS. 25 and 27, the controller 500a may receive the first and second image information I1 and I2 from the imaging unit 200a.

The controller 500a may extract a sawing line L1 using a sawing indication E2 in the second image information I2. The controller 500a may overlap the first and second image information I1 and I2 based on the position of reference hall H1 in the received first image information I1 and the position of reference hall H1 in the received second image information I2.

In an embodiment, the controller 500a may extract the sawing line L1 after overlapping the first and second image information I1 and I2. A cutting tool such as a blade or the like may cut an electronic device region A along the sawing line L1. In this case, the sawing line L1 may not be coincident with an edge line L2 of the electronic device region A which is cut by the cutting tool.

After the sawing line L1 is extracted, the controller 500a may extract the edge line L2 (indicated by the dotted rectangular outline) by compensating the thickness of the cutting tool for cutting the electronic device region A along the sawing line L1. The controller 500a may overlap the first image information I1 with the second image information I2 from which the edge line L2 is extracted. When the first and second image information I1 and I2 are overlapped, the controller 500 may use the position of the reference hall H1 in the first image information I1 and the position of the reference hall H1 in the second image information I2.

Figure 28:
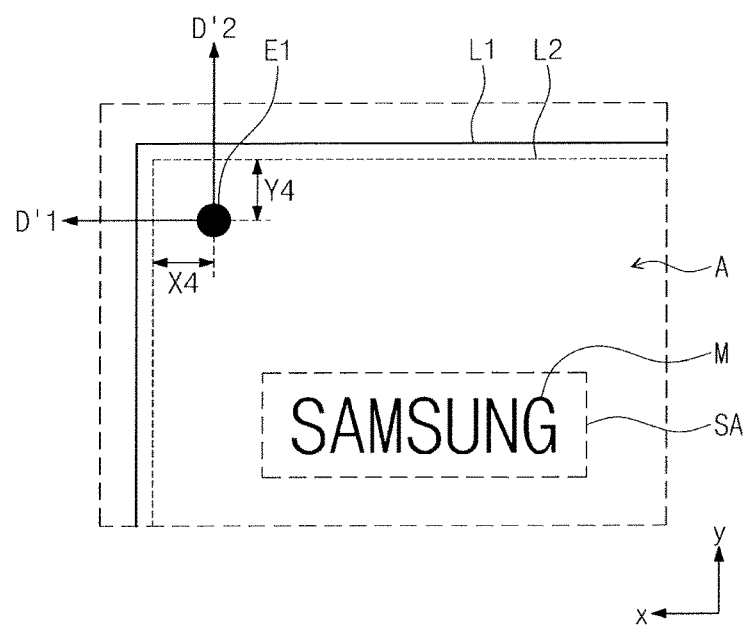
FIG. 28 illustrates an embodiment of enlarged area EA4 in FIG. 27.
Figure 29:
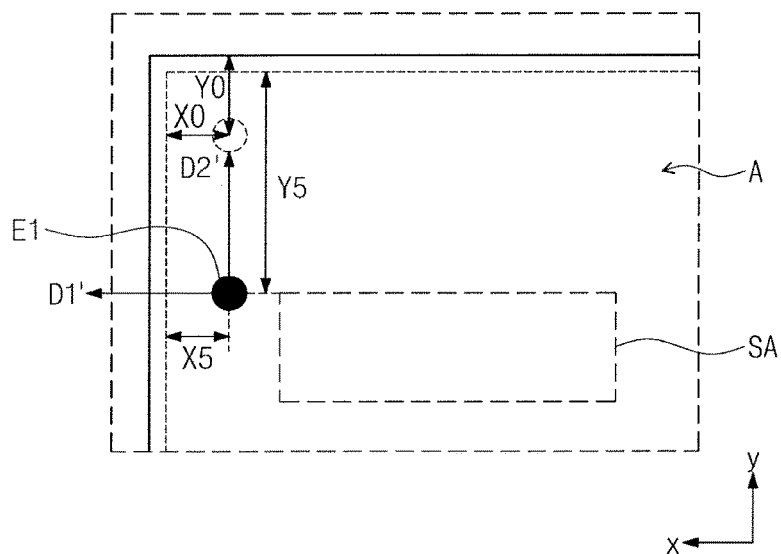
FIG. 29 illustrates an embodiment of enlarged area EA5 in FIG. 27.
Figure 30:
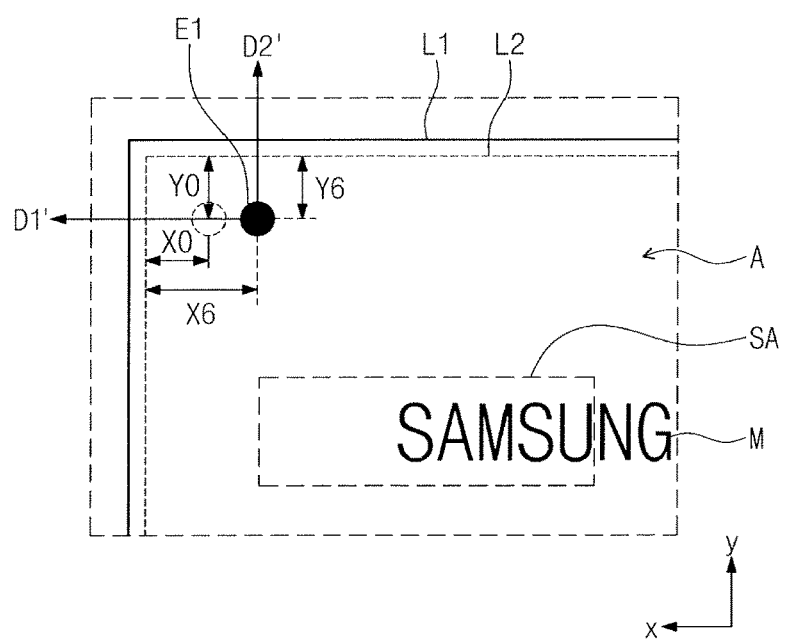
FIG. 30 illustrates an embodiment of enlarged area EA6 in FIG. 27.
Figure 31:
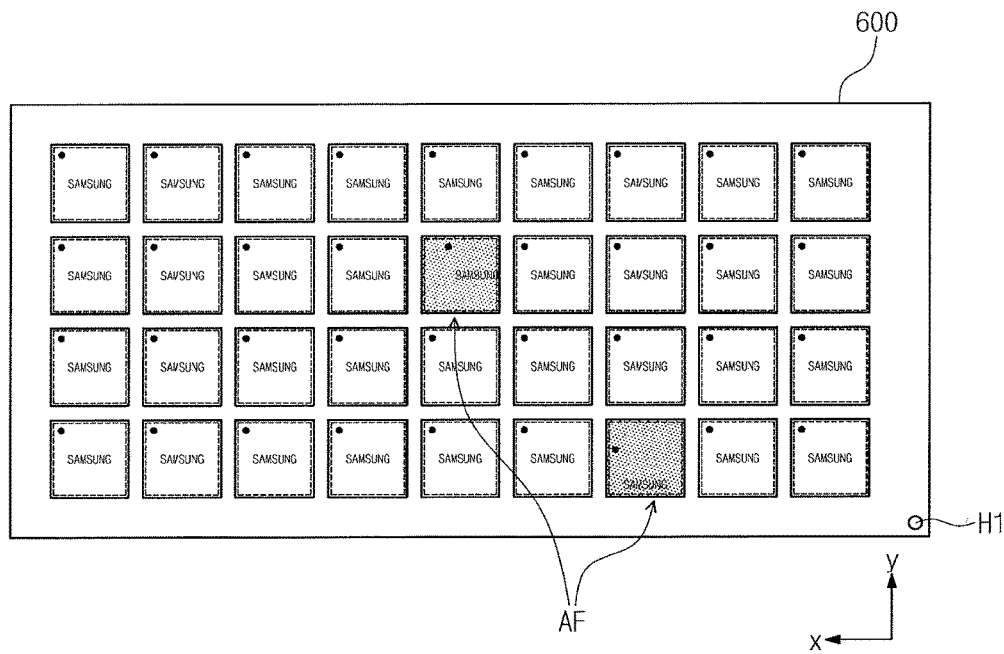
FIG. 31 illustrates another embodiment of a display of FIG. 26.

FIG. 28 illustrates an example of an enlarged are EA4 of FIG. 27. FIG. 29 illustrates an enlarged area EA5 of FIG. 27. FIG. 30 illustrates an enlarged area EA6 of FIG. 27. FIG. 31 illustrates an embodiment of the display unit of FIG. 26 for displaying information for predicting a mark location.

Referring to FIGS. 26 and 28 to 31, the controller 500a may use the edge line L2 and a reference indication E1 to calculate a spaced distance therebetween. In an embodiment, the controller 500a may calculate a first spaced distance between the reference indication E1 and the edge line L2 in a first direction D'1. The controller 500a may also calculate a second spaced distance between the reference indication E1 and the edge line L2 in a second direction D'2 different from the first direction D'1.

The controller 500a may predict the position of mark M on each of the electronic device regions A, which will be cut and separated from each other along the sawing line L1, according to whether the calculated spaced distance corresponds to a predetermined reference distance. When the calculated spaced distance corresponds to the reference distance, the controller 500a may predict that the mark M is positioned on a predetermined reference area SA.

Referring to FIGS. 26 and 28, when a first spaced distance X4 corresponds to the first reference distance and a second spaced distance Y4 corresponds to the second reference distance, the controller 500a may predict that the mark M is positioned on the reference area SA.

Referring to FIGS. 26 and 29, when a first spaced distance X5 corresponds to a first reference distance X0 but a second spaced distance Y5 does not correspond to a second reference distance Y0, the controller 500a may predict that the mark M is positioned off the reference area SA.

Referring to FIGS. 26 and 30, when a first spaced distance X6 does not correspond to the first reference distance X0 but a second spaced distance Y6 corresponds to the second reference distance Y0, the controller 500a may predict that the mark M is positioned off the reference area SA. The controller 500a may transmit information I3 about the prediction of mark location to the display unit 600. The display unit 600 may display the information I3 to user.

Referring to FIGS. 26, 27, and 31, a poor electronic device region AF, in which the mark M is positioned off the reference area SA, may be displayed differently from the electronic device region A in which the mark M is positioned on reference area SA.

Figure 32:
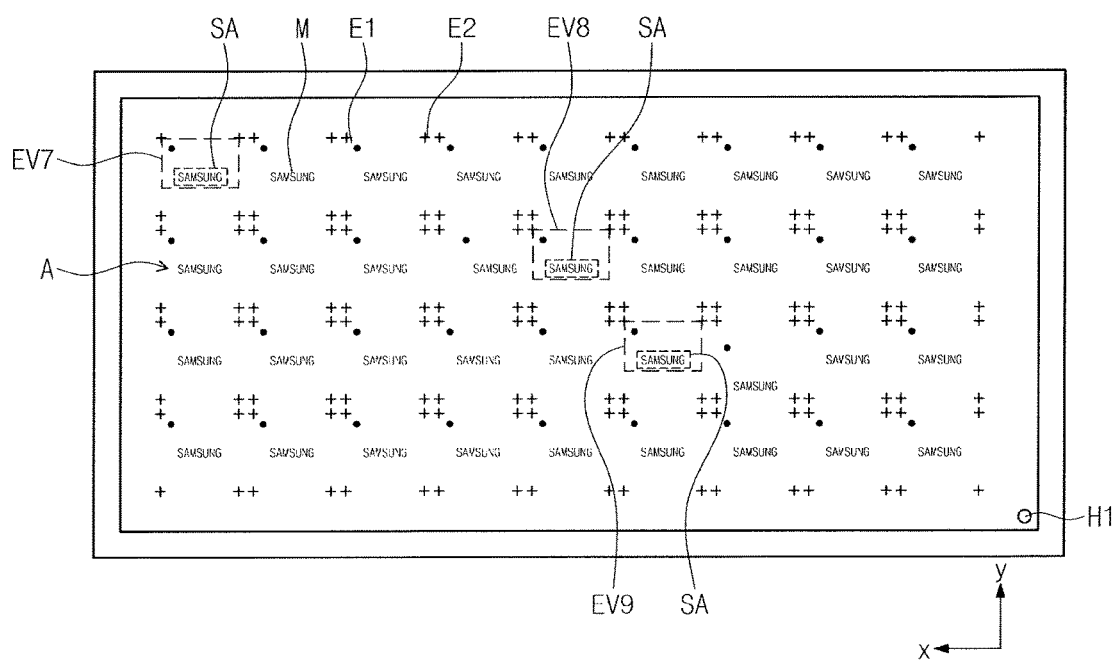
FIG. 32 illustrates another example of an overlapped image.

FIG. 32 illustrates an overlapped image of first and second image information obtained, for example, by the imaging unit of FIG. 2. Referring to FIGS. 1A to 4 and 32, the controller 500 may receive the first and second image information I1 and I2 from the imaging unit 200. The controller 500 may calculate X-Y coordinates of the reference indication E1 and the sawing indication E2 based on the first and second image information I1 and I2. The X-Y coordinates of the reference indication E1 may be calculated based on the reference hall H1 in the first image information I1. The X-Y coordinates of the sawing indication E2 may be calculated based on the reference hall H1 in the second image information I2.

In an embodiment, the reference hall H1 may be set as an origin of the X-Y coordinates. The controller 500 may calculate the X-Y coordinates of the reference indication E1 from a position of the reference indication E1 with respect to the reference hall H1 as the origin. The controller 500 may also calculate the X-Y coordinates of the sawing indication E2 from a position of the sawing indication E2 with respect to the reference hall H1 as the origin. The sawing indication E2 may include a plurality of sawing marks. The controller 500 may calculate X-Y coordinates of each of the sawing marks with respect to the reference hall H1 as the origin.

The controller 500 may overlap the first and second image information I1 and I2 using the position of the reference hall H1 in the first image information I1 and the position of the reference hall H1 in the second image information I2. Therefore, the sawing indications E2 may be displayed on the first image information I1 and the reference indications E1 may be displayed on the second image information I2.

Figure 33:
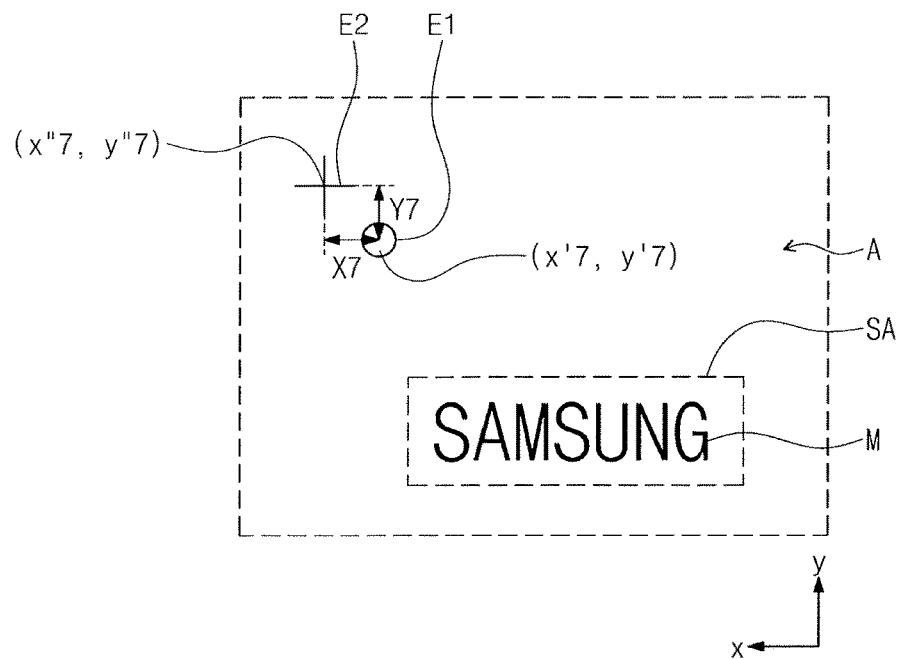
FIG. 33 illustrates an embodiment of enlarged area EA7 in FIG. 32.
Figure 34:
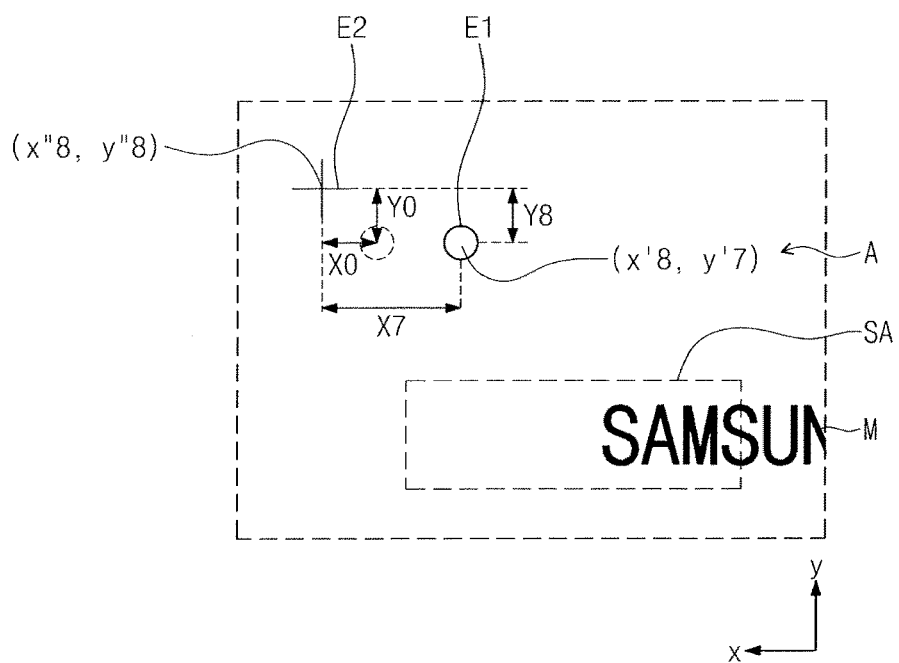
FIG. 34 illustrates an embodiment of enlarged area EA8 in FIG. 32.

FIG. 33 illustrates an example of enlarged area EA7 in FIG. 32. FIG. 34 illustrates an enlarged area EA8 in FIG. 32.

Figure 35:
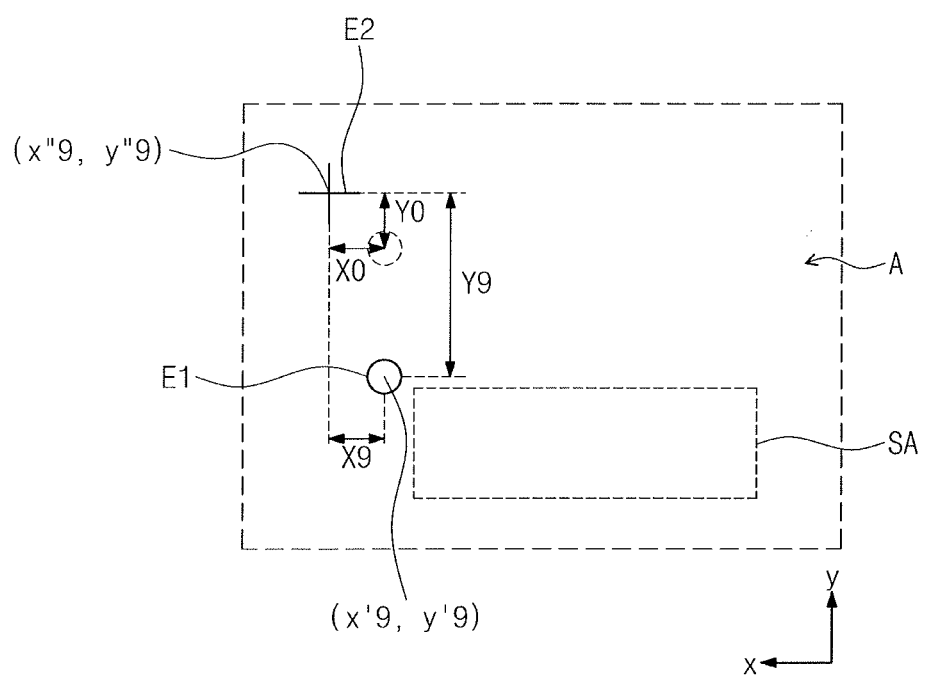
FIG. 35 illustrates an embodiment of enlarged area EA9 in FIG. 32.
Figure 36:
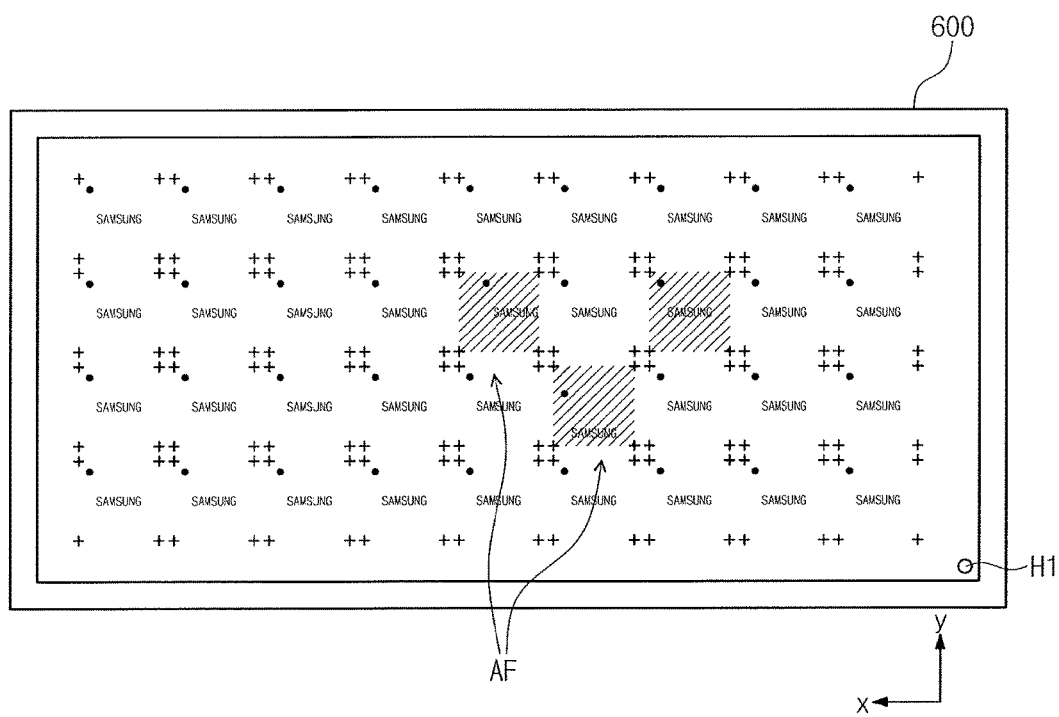
FIG. 36 illustrates another embodiment of a display.

FIG. 35 illustrates an enlarged area EA9 in FIG. 32. FIG. 36 illustrates another embodiment of the display unit in FIG. 2 for displaying information for predicting of a mark location.

Referring to FIGS. 2 and 32 to 36, the controller 500 may use the X-Y coordinates of the reference and sawing indications E1 and E2 to calculate X and Y distances between the reference indication E1 and the sawing indication E2. The X distance may correspond, for example, to the absolute value of the difference between the X coordinate of the reference indication E1 and the X coordinate of the sawing indication E2. The Y distance may correspond, for example, to the absolute value of the difference between the Y coordinate of the reference indication E1 and the Y coordinate of sawing indication E2.

The controller 500 may determine whether a predetermined reference distance corresponds to calculated X and Y distances. The controller 500 may predict the location of mark M on each of the electronic device regions A, which will be cut and separated from each other according to whether the reference distance corresponds to the X and Y distances. The reference distance corresponding to the X and Y distances may mean not only that the X and Y distances are in accordance with the reference distance, but also that the X and Y distances are within a tolerance of the reference distance. The reference distance may include a first reference distance corresponding to the X distance and a second reference distance corresponding to the Y distance.

Referring to FIGS. 2 and 33, (x'7, y'7) may be given as the X-Y coordinates of the reference indication E1 and (x"7, y"7) may be given as the X-Y coordinates of the sawing mark which is adjacent to the reference indication E1. The controller 500 may then calculate to produce |x'7−x"7| as the X distance and |y'7−y"7| as the Y distance. When each of the X distance X7 and a Y distance Y7 correspond to the reference distance, the controller 500 may predict that the mark M is positioned on the reference area SA.

Referring to FIGS. 2 and 34, (x'8, y'8) may be given as the X-Y coordinates of the reference indication E1 and (x"8, y"8) may be given as the X-Y coordinates of the sawing mark which is adjacent to the reference indication E1. The controller 500 may then calculate to produce |x'8−x"8| as the X distance and |y'8−y"8| as the Y distance. When an X distance X8 does not correspond to a first reference distance X0, but a Y distance Y8 corresponds to a second reference distance Y0, the controller 500 may predict that the mark M is positioned off the reference area SA.

Referring to FIGS. 2 and 35, (x'9, y'9) may be given as the X-Y coordinates of the reference indication E1 and (x"9, y"9) may be given as the X-Y coordinates of the sawing mark which is adjacent to the reference indication E1. The controller 500 may then calculate to produce |x'9−x"9| as the X distance and |y'9−y"9| as the Y distance.

When an X distance X9 correspond to the first reference distance X0 but a Y distance Y9 does not corresponds to the second reference distance Y0, the controller 500 may predict that the mark M is positioned off the reference area SA.

Information I3 about the prediction of mark location may be transmitted to the display unit 600 from the controller 500. The display unit 600 may display the information I3 to user.

Referring to FIGS. 2 and 36, a poor electronic device region AF, in which the mark M is positioned off the reference area SA, may be displayed differently from the electronic device region A in which the mark M is positioned on the reference area SA.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controllers and other processing features of the embodiments disclosed herein may be implemented in logic which, for example, may include hardware, software, or both. When implemented at least partially in hardware, the controllers and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

In accordance with one or more embodiments, it is possible to predict whether a mark, which is displayed on each of a plurality of electronic device regions to be cut and be separated from each other, is positioned on the predetermined reference area. A manufacturer may therefore remove in advance defective ones, on which the mark is poorly displayed, from electronic devices provided to customers. The apparatus may promptly predict the location of a mark displayed on each of the electronic device regions, which may result in reducing the process time.

Example embodiments have been disclosed herein, and although specific terms are employed, they are used and are to be interpreted in a generic and descriptive sense only and not for purpose of limitation. The embodiments (or portions thereof) may be combined to form additional embodiments. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the embodiments set forth in the claims.

What is claimed is:
1. A method for predicting a mark location, the method comprising:

loading an substrate on a stage, the substrate including a plurality of electronic device regions, each electronic device region having a mark and a reference indication on a first surface of the substrate and a sawing indication on a second surface of the substrate, the second surface opposite to the first surface;
obtaining first and second image information based on images of the first and second surfaces;
extracting a sawing line based on the sawing indication in the second image information;
calculating a first spaced distance between the sawing line and the reference indication in the first information in a first direction;
calculating a second spaced distance between the sawing line and the reference indication in a second direction different from the first direction; and
predicting a location of the mark according to whether the first and second spaced distances correspond to a predetermined reference distance, the mark included on each of the electronic device regions which are separated from each other along the sawing line.

2. The method as claimed in claim 1, wherein:
the substrate includes at least one reference hall penetrating the substrate,
extracting the sawing line includes:
overlapping the first and second image information based on a position of the reference hall in the first image information and a position of the reference hall in the second image information; and thereafter
extracting the sawing line based on the sawing indication.

3. The method as claimed in claim 1, wherein:
the substrate includes at least one reference hall penetrating the substrate,
calculating the first and second spaced distances includes:
after extracting the sawing line from the second image information, overlapping the first and second image information based on a position of the reference hall in the first image information and a position of the reference hall in the second image information.

4. The method as claimed in claim 1, wherein calculating the first and second spaced distances includes compensating a thickness of a cutting tool to be used to cut the electronic device regions along the sawing line.

5. The method as claimed in claim 1, wherein the stage includes:
a first transparent plate:
a second transparent plate on one side of the first transparent plate; and
a driver to move at least one of the first and second transparent plates so that the first and second transparent plates are adjacent to each other,
wherein loading the substrate on the stage includes:
positioning the substrate on one of the first or second transparent plates; and
moving at least one of the first or second transparent plates to bring the substrate into contact with the other of the first or second transparent plates.

6. The method as claimed in claim 5, wherein each of the first and second transparent plates includes transparent glass.

7. The method as claimed in claim 1, wherein:
the first image information is obtained by an imager that is to photograph the first surface of the substrate loaded on the stage while moving in one direction, and
the second image information is obtained by the imager that is to photograph the second surface of the substrate loaded on the stage while moving in other direction opposite to the one direction.

8. The method as claimed in claim 1, wherein obtaining the first and second image information includes:
rotating the substrate by a predetermined angle to change positions of the first and second surfaces after obtaining one of the first or second image information, wherein the electronic device regions are on the surface of the substrate.

9. The method as claimed in claim 1, further comprising:
after obtaining the first and second image information, unloading the substrate from the stage.

10. The method as claimed in claim 1, wherein the second direction crosses the first direction.

11. The method as claimed in claim 1, wherein the reference indication includes a dot.

12. A method for predicting location of mark, the method comprising:
loading an substrate on a stage, the substrate including a plurality of electronic device regions, each having a mark and a reference indication on a first surface and a sawing indication on a second surface opposite to the first surface;
obtaining first and second image information based on images of the first and second surfaces;
calculating first and second coordinates of the reference indication and first and second coordinates of the sawing indication using the first and second image information;
calculating first and second distances, each between the reference indication and the sawing indication using their respective first and second coordinates; and
predicting a location of the mark according to whether the first and second distances correspond to a predetermined reference distance, the mark included on each of the electronic device regions which are separated from each other.

13. The method as claimed in claim 12, wherein:
the substrate includes at least one reference hall penetrating the substrate, and
the respective first and second coordinates of the reference and sawing indications are calculated from positions of the reference and sawing indications with respect to the reference hall.

14. The method as claimed in claim 13, wherein calculating the first and second distances includes overlapping the first and second image information based on a position of the reference hall in the first image information and a position of the reference hall in the second image information.

15. The method as claimed in claim 12, wherein:
the sawing indication includes a plurality of sawing marks, and
calculating the first and second distances includes determining first and second distances between the reference indication and one of the sawing marks adjacent to the reference indication.

16. A method for inspecting a semiconductor product, comprising:
receiving image information for electronic device regions on a substrate;
identifying a sawing line based on the image information;
determining a position of a reference indication based on the sawing line; and
predicting a location of a mark for at least one of the electronic device regions based on the position of the reference indication and predetermined reference information.

17. The method as claimed in claim 16, wherein the image information includes:

first image information corresponding to a first surface of the substrate, and second image information corresponding to a second surface of the substrate opposing the first surface.

18. The method as claimed in claim 17, wherein determining the position of the reference indication includes:

overlapping the first and second image information based on a position of a reference hall in the first image information and a position of a reference hall in the second image information, and wherein the saw line is extracted from the overlapped first and second image information.

19. The method as claimed in claim 18, wherein:

the position of the reference indication includes a first distance spaced from the sawing line in a first direction and a second distance spaced from the sawing line in a second direction, and the predetermined reference information includes a first reference distance spaced from the sawing line in the first direction and a second reference distance spaced from the sawing line in the second direction.

20. The method as claimed in claim 18, wherein the reference hall in the first image information and the reference hall in the second image information correspond to a same reference hall passing through the substrate.

* * * * *